(12) United States Patent
Kunau

(10) Patent No.: US 9,649,897 B2
(45) Date of Patent: May 16, 2017

(54) TUBELESS TIRE SEATING DEVICE

(75) Inventor: Daniel Kunau, Boone, CO (US)

(73) Assignee: Gaither Tool Company, Incorporated, Jacksonville, IL (US)

( * ) Notice: Subject to any disclaimer, the term of this patent is extended or adjusted under 35 U.S.C. 154(b) by 1462 days.

(21) Appl. No.: 13/085,551

(22) Filed: Apr. 13, 2011

(65) Prior Publication Data

US 2011/0253318 A1    Oct. 20, 2011

Related U.S. Application Data

(63) Continuation-in-part of application No. 13/018,383, filed on Jan. 31, 2011, now Pat. No. 8,752,604, and a
(Continued)

(30) Foreign Application Priority Data

Apr. 7, 2011    (WO) ................. PCT/US2011/031619

(51) Int. Cl.
*B60C 25/132*  (2006.01)
*B21D 53/26*   (2006.01)
*B60C 25/14*   (2006.01)

(52) U.S. Cl.
CPC ....... *B60C 25/145* (2013.04); *Y10T 29/49494* (2015.01)

(58) Field of Classification Search
CPC ... B60C 25/147; B60C 25/145; B60C 25/132; B60C 25/00; B60C 23/0496;
(Continued)

(56) References Cited

U.S. PATENT DOCUMENTS 1,459,775 A    6/1923  Larnner
2,634,717 A *  4/1953  Junkin ................. F41B 11/723
                                                          124/50
(Continued)

FOREIGN PATENT DOCUMENTS

EP    0408921 A1    1/1991

OTHER PUBLICATIONS

BS-07 Cheetah(R) Bead Seater, Publication date unknown, retreived on Mar. 15, 2011 from http://www.tsissg.com/aitdownloadablefiles/download/aitfile/aitfile_id/87/.
(Continued)

*Primary Examiner* — Hadi Shakeri
(74) *Attorney, Agent, or Firm* — Brevetto Law Group

(57) ABSTRACT

A tool for seating a tubeless tire on a rim using pressurized gas includes a cylindrical pressure vessel with a pistol grip extending radially from the tank. The tool includes a rapid opening gas valve positioned between the cylindrical pressure vessel and a nozzle. In some embodiments the nozzle includes a jet configured to receive pressurized gas from the cylindrical pressure vessel into a chamber of the nozzle so that as the stream of gas enters the chamber, the Venturi effect causes air to enter the chamber through air intake ports and the stream of gas and air from the air intake ports is blown out of the outlet of the nozzle. The tire is seated on the rim by positioning the system so that the air from the nozzle rapidly blows into the tire between the bead of the tire and the rim upon the valve being opened.

17 Claims, 20 Drawing Sheets

Related U.S. Application Data continuation-in-part of application No. 13/051,697, filed on Mar. 18, 2011, now Pat. No. 9,033,306.

(60) Provisional application No. 61/469,663, filed on Mar. 30, 2011, provisional application No. 61/342,316, filed on Apr. 14, 2010.

(58) Field of Classification Search
CPC ....... B60C 25/14; B60C 25/451; B60S 5/043; B60S 5/04; B60B 31/005; Y10T 29/49494
USPC ..... 157/1.17, 1.1, 1; 137/587, 227, 223, 224
See application file for complete search history.

(56) References Cited

U.S. PATENT DOCUMENTS

| | | | | |
|---|---|---|---|---|
| 2,839,862 | A | * | 6/1958 | Hanshaw ............................ 43/6 |
| 2,841,359 | A | | 7/1958 | Berk |
| 2,919,714 | A | | 1/1960 | Mrazek |
| 3,297,047 | A | | 1/1967 | Sime |
| 3,380,469 | A | | 4/1968 | Salerno et al. |
| 3,399,689 | A | | 9/1968 | Keane |
| 3,415,269 | A | | 12/1968 | Salerno |
| 3,566,907 | A | * | 3/1971 | Sime ....................... F16K 1/126 137/219 |
| 3,633,822 | A | * | 1/1972 | Hruby, Jr. ................ B05B 17/08 239/17 |
| 3,866,654 | A | * | 2/1975 | Duquesne ............. B60C 25/145 137/223 |
| 3,971,412 | A | | 7/1976 | Wierzbicki |
| 3,977,423 | A | | 8/1976 | Clayton |
| 4,026,327 | A | | 5/1977 | Deinlein-Kalb |
| 4,234,009 | A | | 11/1980 | Fuchs |
| 4,285,495 | A | | 8/1981 | King |
| 4,732,189 | A | | 3/1988 | Jones et al. |
| 5,072,764 | A | | 12/1991 | Ochoa |
| 5,143,256 | A | * | 9/1992 | Wadensten ........... B65D 88/703 222/195 |
| 5,168,911 | A | | 12/1992 | Gottschalk |
| 5,450,839 | A | * | 9/1995 | Nicolaevich et al. .......... 124/73 |
| 5,456,302 | A | | 10/1995 | Demers |
| 5,487,527 | A | | 1/1996 | Eggleston |
| 5,509,456 | A | | 4/1996 | Bonko et al. |
| 5,549,132 | A | * | 8/1996 | Butterfield ............... B67D 7/42 137/270 |
| 5,570,733 | A | * | 11/1996 | Desparois et al. ............. 157/1.1 |
| 5,842,501 | A | | 12/1998 | Powell et al. |
| 5,878,774 | A | * | 3/1999 | Zanetti .................... B60S 5/043 137/228 |
| 5,878,801 | A | | 3/1999 | Ellis |
| 5,884,659 | A | * | 3/1999 | Prosser et al. ................ 137/587 |
| 5,960,841 | A | * | 10/1999 | Green ............................ 141/383 |
| 6,161,570 | A | | 12/2000 | McNeely |
| 6,179,033 | B1 | * | 1/2001 | Demers ........................ 157/1.17 |
| 6,321,939 | B1 | * | 11/2001 | Treat ................... F16K 17/0433 222/195 |
| 6,454,892 | B1 | * | 9/2002 | Gerresheim et al. ......... 156/115 |
| 6,726,059 | B2 | * | 4/2004 | Treat .................... B65D 88/703 137/493.1 |
| 6,981,842 | B2 | | 1/2006 | D'Angelo et al. |
| 7,000,667 | B2 | | 2/2006 | Brahler |
| 7,017,642 | B2 | | 3/2006 | Brahler |
| 7,395,749 | B2 | * | 7/2008 | Adams .................. F15B 15/227 91/395 |
| 9,033,306 | B2 | * | 5/2015 | Kunau .................. B60C 25/145 141/38 |
| 9,080,832 | B2 | * | 7/2015 | Brahler, II ............ F41B 11/723 |
| 2003/0178151 | A1 | * | 9/2003 | Ritchie et al. ............... 157/1.17 |
| 2011/0038738 | A1 | * | 2/2011 | Kojima ................... F04B 35/06 417/63 |
| 2014/0048215 | A1 | * | 2/2014 | Barrios ................ B60C 25/145 157/1.17 |

OTHER PUBLICATIONS

BS-07 Bead Seating Tool Operating Instructions, Publication date unknown, retreived on Mar. 15, 2011 from http://www.tsissg.com/aitdownloadablefiles/download/aitfile/aitfile_id/88/.

BS-07 Bead Seater, Aug. 2001, retreived on Mar. 15, 2011 from http://www.tsissg.com/aitdownloadablefiles/download/aitfile/aitfile_id/250/.

CH-5 & CH-10 Cheetah(R) Bead Seaters, Publication date unknown, retreived on Mar. 15, 2011 from http://www.tsissg.com/aitdownloadablefiles/download/aitfile/aitfile_id/373/.

CH-5 Operating & Maintenance Instructions Cheetah Bead Seater, Nov. 2002, retreived on Mar. 15, 2011 from http://www.tsissg.com/aitdownloadablefiles/download/aitfile/aitfile_id/373/.

Cheetah(R) Bead Seating Tool Instruction Manual, Jun. 2010, retreived on Mar. 15, 2011 from http://www.tsissg.com/aitdownloadablefiles/download/aitfile/aitfile_id/688/.

Principle of the Axial Valve, unknown publication date, downloaded from http://www.duncanrogers.com/literature/axialvalve.pdf on about Jan. 25, 2011.

The DANFLO Family of Control Valves, Nov. 2009, downloaded from http://www.mandjvalve.com/literature/MJ-1690_DANFLOfamily_mj.pdf on about Jan. 25, 2011.

Pneumatically Operated Deluge Valve model 116FC, Mar. 16, 1999, downloaded from http://www.controlvalves.com/valveFiles/sWJNy-DGVpx-KNIGW-116FC_OM_with_sizes.PDF on about Jan. 25, 2011.

Gaither Product Catalogue, 2006, Gaither Tool Company.

Bead Booster Marketing One-Sheet for GB-5ZA and GB-5Z, 2010, Gaither Tool Company.

Gaither Product Catalog, May 19, 2010, Gaither Tool Company, downloaded from http://www.gaithertool.com/images/stories/PDF/flyeruklr.pdf on Jul. 25, 2011.

* cited by examiner

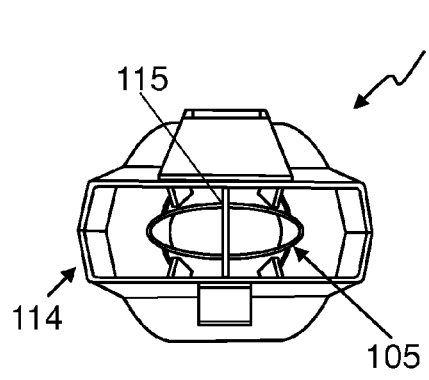 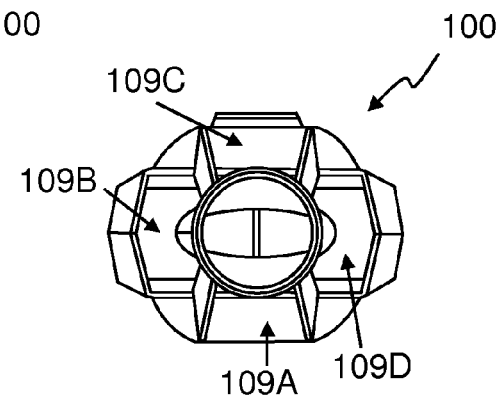
FIG. 11D  FIG. 11E
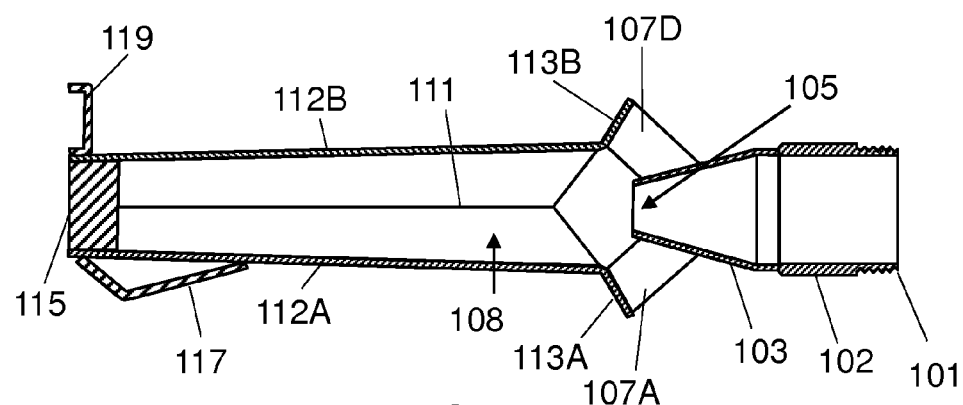
FIG. 12
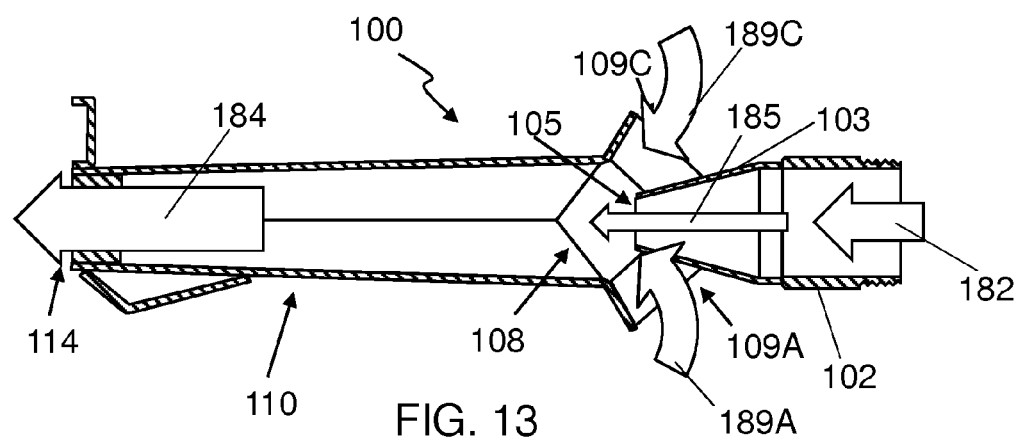
FIG. 13

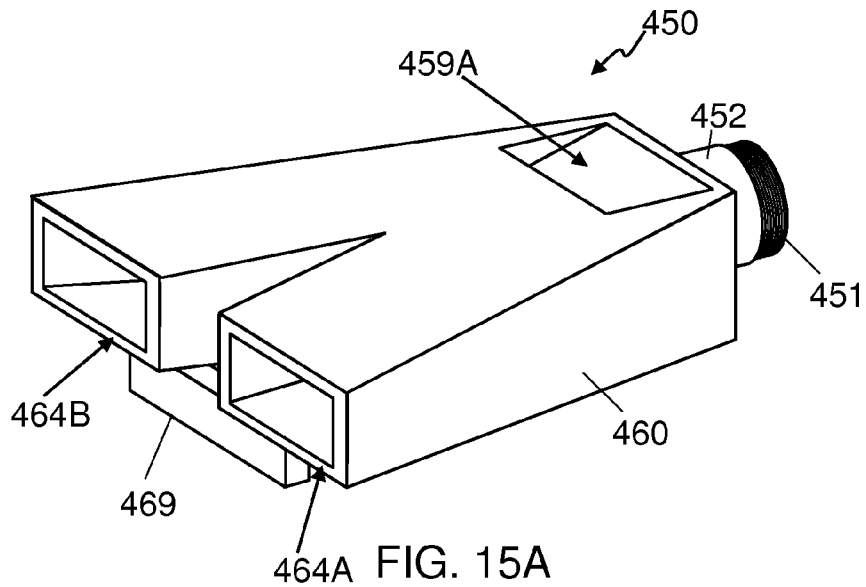
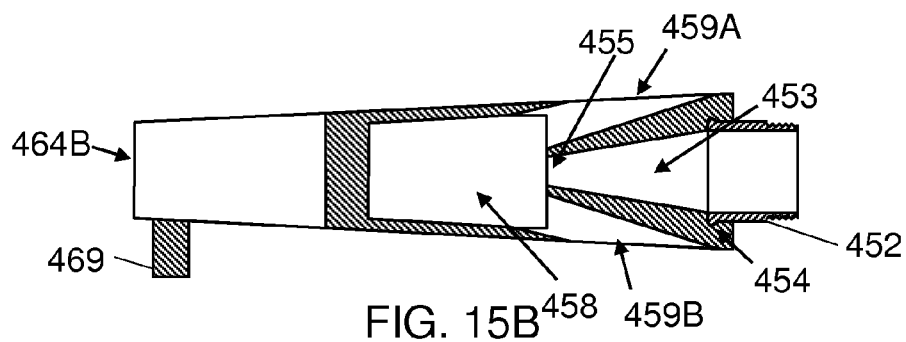
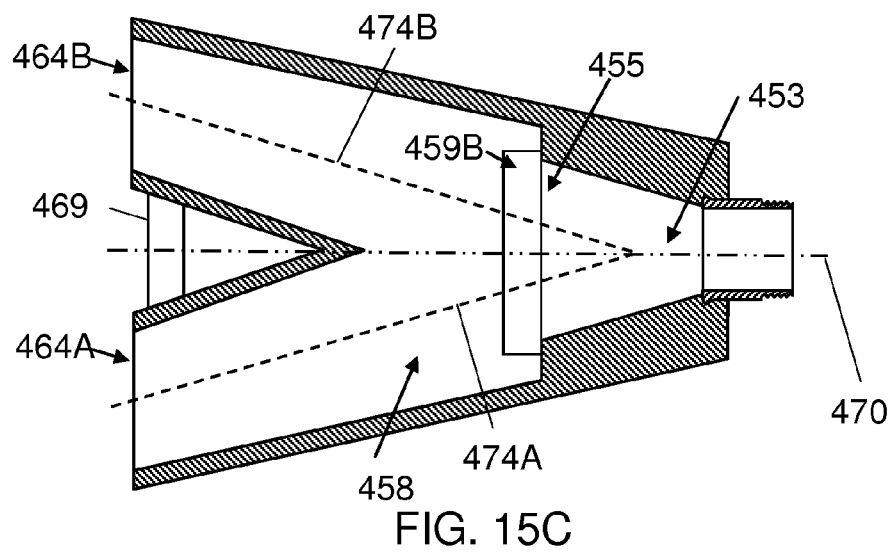

TUBELESS TIRE SEATING DEVICE

CROSS-REFERENCE TO RELATED APPLICATIONS

This application is a continuation of International Application Ser. No. PCT/US11/31619 filed in English on Apr. 7, 2011 which is a continuation-in-part of U.S. application Ser. No. 13/018,383 filed on Jan. 31, 2011, a continuation-in-part of U.S. application Ser. No. 13/051,697 filed on Mar. 18, 2011, and claims benefit of U.S. Provisional Application Ser. No. 61/469,663 filed Mar. 30, 2011, and U.S. Provisional Application Ser. No. 61/342,316 filed Apr. 14, 2010, and the contents all five aforementioned applications are incorporated herein by reference in their entirety.

BACKGROUND

Technical Field

The present subject matter relates to tools. More specifically, the present subject matter relates to a tool for seating a tubeless tire on a rim.

Description of Related Art

Many tires for automobiles, trucks and other equipment are designed to be mounted on wheels or rims without using a tube. The tire may be impervious to air with a bead around the inner edges of the tire designed to press against a lip of the rim to create an air-tight seal so that the combination of the tire and rim may be able to hold pressurized air or other gases. The rim may include a valve stem that may be used to inflate the tire.

After a tire is first mounted on a rim, the bead of the tire may not press tightly against the lip of the rim so that no air-tight cavity is created. In some cases, especially for smaller tires, enough air may be injected through the valve stem to create a pressure differential between the air inside the tire and the outside air so that, even though air may be escaping between the tire and the rim, the bead of the tire is pressed against the rim to create a seal. This may be referred to as seating the tire on the rim. Seating the tire on the rim allows the tire to be pressurized. But in some cases, especially with larger tires, it is just not possible to seat the tire by injecting air through the valve stem of the rim.

It is well known in the art to blow a high volume of air between the rim and the bead of the tire, creating the pressure differential between the pressure of the air in the tire and the outside air pressure, thereby seating the tire on the rim. Conventional devices to accomplish this generally include a large, yet portable, pressurized air tank with a conventional valve such as a ball valve or butterfly valve leading to a discharge barrel. The discharge barrel is typically a solid, leak-proof metal tube rigidly connected to extend from the tank. The tank and discharge barrel may be positioned to blow a high volume of air from the pressurized air tank into the tire. The tank of conventional devices must be sized to hold enough air at a high enough pressure to expand the tire against the rim, and then completely fill the volume of the tire to a pressure greater than the atmospheric pressure in order to seat the tire against the rim. This may lead to a large unwieldy air tank and/or dangerously high pressures to accomplish this for large tires.

SUMMARY

According to various embodiments a tool for seating a tubeless tire on a rim using pressurized gas includes a cylindrical pressure vessel with an input port, the input port suitable for filling the cylindrical pressure vessel with pressurized gas. A nozzle pneumatically coupled to an outlet on a distal end of the cylindrical pressure vessel is also included. The nozzle is configured to blow gas between a rim and a tire bead. A gas valve is configured to control a flow of gas from the outlet on the distal end of the cylindrical pressure vessel. A grip extends radially from the cylindrical pressure vessel with a release control located at a position within 15 centimeters (cm) of the grip. The gas valve is configured to open in response to actuation of the release control, allowing the pressurized gas to flow through the outlet on the distal end of the cylindrical pressure vessel and out the nozzle.

A method for seating a tubeless tire on a rim includes filling a cylindrical pressure vessel with a pressurized gas to a primary pressure, and holding the cylindrical pressure vessel by using a hand to hold a grip extending radially from the cylindrical pressure vessel to position a nozzle toward the tubeless tire on the rim. The nozzle is pneumatically coupled to an outlet on a distal end of the cylindrical pressure vessel. A rim bracket on the nozzle is positioned against a lip of the rim, with a nozzle outlet positioned between the rim and the tire mounted on the rim. Then a release control is actuated using a finger of the hand holding the grip to open a gas valve. This allows the pressurized gas in the cylindrical pressure vessel to flow through the outlet on the distal end of the cylindrical pressure vessel to the nozzle, out the nozzle outlet, to create a stream of gas. The stream of gas flows between the lip of the rim and a bead on the tire, into the tire, causing the bead of the tire to be seated against the rim.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. They should not, however, be taken to limit the invention to the specific embodiment(s) described, but are for explanation and understanding only. In the drawings:

FIG. 11A-11E show bottom, side, top, front and rear views of the tire seating nozzle of FIG. 10A;

FIG. 12 shows a cross-sectional view of the tire seating nozzle of FIG. 10A;

FIG. 13 shows gas flowing through a cross-sectional view of the tire seating nozzle of FIG. 10A;

FIG. 15A-C show another alternative embodiment of a tire seating nozzle; and

DETAILED DESCRIPTION

The present inventor recognized a problem with conventional designs of devices to seat a tubeless tire. Namely, the conventional designs feature a tank size that is either too large or too heavy (due to being too heavily reinforced) to be easily portable and yet attain a burst of air sufficient to mount a tubeless tire on a wheel rim. Moreover, the inventor recognized that with conventional tank designs it is difficult to hold the nozzle far enough away from the user to prevent dirt and debris from blowing back to the user's face when the burst of air seats the tire. The inventor recognized the benefits of being able to use a smaller more easily portable tank configured to hold the nozzle safely away from the user's face. The present invention alters the design of a conventional tire seating tool to provide a higher speed gas burst and greater volume of gas into the tire for a given tank size, with the nozzle being safely positioned away from the user's face. In this way tire seating tools according to the various embodiments disclosed herein can be used with smaller, more easily portable, sized tanks.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraph for clarity.

Mounting a tire refers to the act of placing a tire on a rim by sliding both beads of the tire over the rim so that the tire is on the rim with both beads between the two lips of the rim. Seating a tire refers to placing the beads of the tire against the lips of the rim, creating a seal and allowing the tire to be inflated to a desired pressure. For the purposes of this specification and claims, a tire is first mounted on the rim before the tire may be seated. With conventional devices it can be quite difficult to seat the tire on a rim so it can be inflated due to the gap between the tire and the rim once the tire has been mounted. Reference now is made in detail to the examples illustrated in the accompanying drawings and discussed below.

Figure 1A:
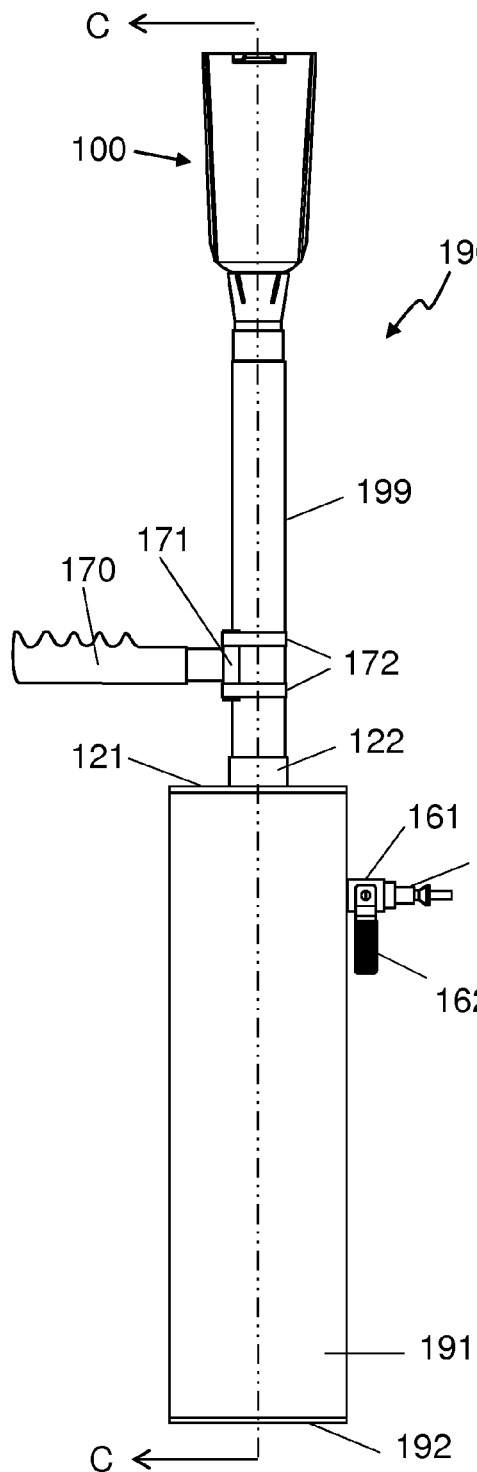
FIG. 1A shows a top view and FIG. 1B shows a side view of an embodiment of a tubeless tire seating device.
Figure 1B:
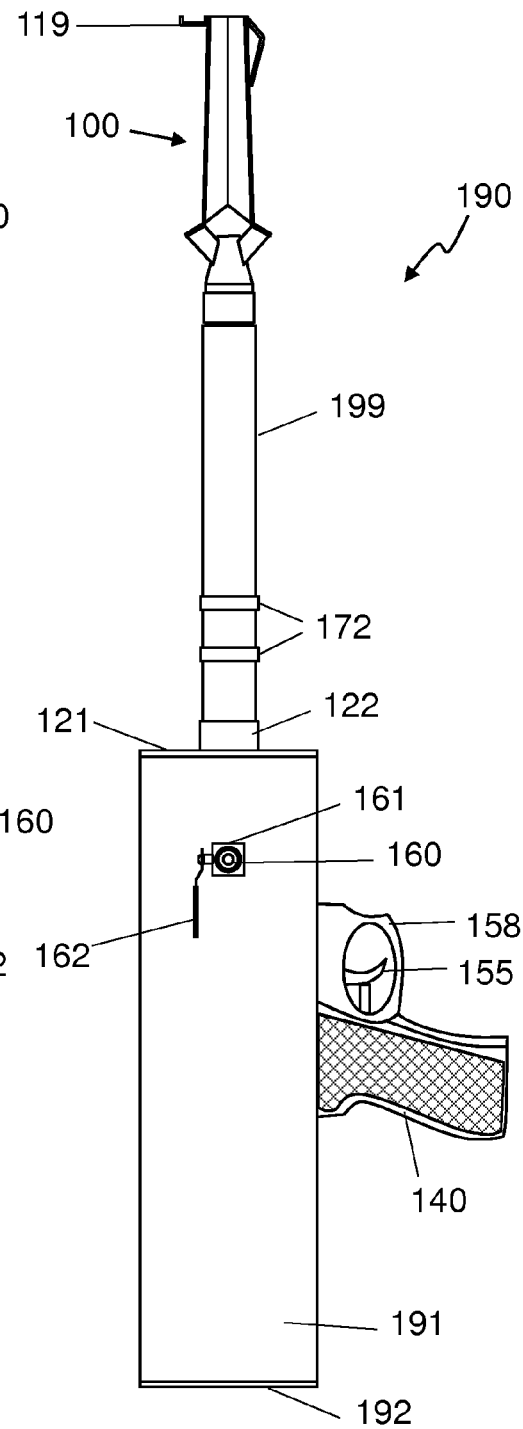
Figure 1C:
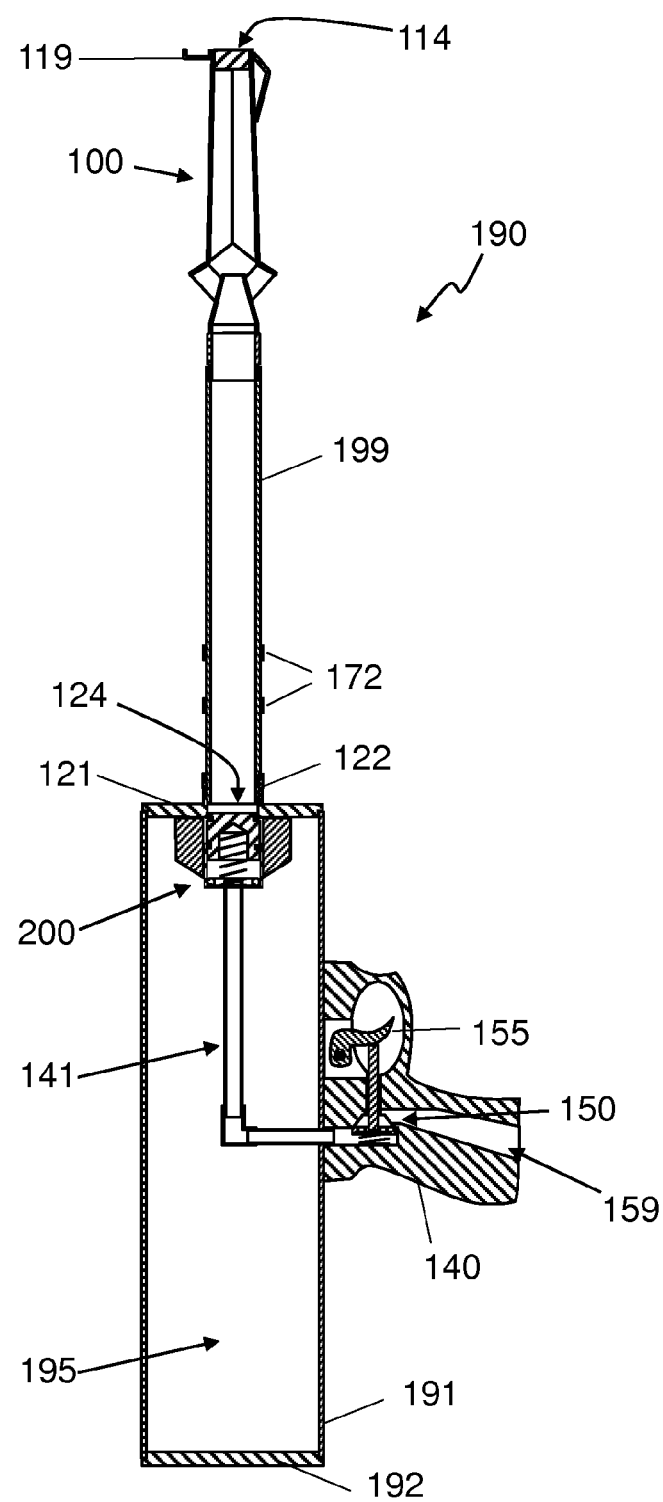
FIG. 1C shows a cross sectional view of the tubeless tire seating device of FIG. 1A.

FIGS. 1A-D, and 2A-B show the same embodiment of tubeless tire seating device 190. Therefore, the same reference numbers are used throughout these drawings and reference may be made to the various drawings in the description. FIG. 1A shows a top view and FIG. 1B shows a side view of an embodiment of a tubeless tire seating device 190. FIG. 1C shows a cross sectional view of the tubeless tire seating device 190 at a position shown by the C:C cut line in FIG. 1A.

The embodiment of the tubeless tire seating device 190 shown includes a cylindrical pressure vessel 191 with a closed end cap 192 on a proximal end of the cylindrical pressure vessel and a distal end cap 121 that includes an output fitting 122 providing an outlet 124 on the distal end of the cylindrical pressure vessel. In some embodiments, the pressure vessel 191 may be manufactured differently and may be formed from more or fewer parts such as being formed from two clamshell type halves or of multiple sections. Other shapes may be used for the pressure vessel of other embodiments and any shape of pressure vessel where the difference between the minimum distance and the maximum distance from the axis of the pressure vessel to the inside surface of the pressure vessel is less than 33% of the maximum distance may be considered cylindrical for the purposes of this specification and included claims. Some embodiments of a cylindrical pressure vessel 191 may have one or both ends rounded or hemispherical in shape instead of the flat end caps 192, 121 shown.

The pressure vessel 191 may enclose a primary gas reservoir 195. Various embodiments may utilize different sized pressure vessels but in at least one embodiment, the volume of the primary gas reservoir 195 enclosed by the pressure vessel 191 may be less than 6.1 liters and able to safely hold pressures of up to 150 pounds per square inch (psi) although other embodiments may be designed for smaller or larger pressure vessels rated for higher or lower maximum pressures. Pressure vessels with a volume of 6 liters or less may not require the same level of regulatory certification as larger pressure vessels which may provide a cost advantage for a tubeless tire seating device 190 using a pressure vessel 191 of 6 liters or less. In other embodiments, an even smaller volume of gas may be required for a tire seating device 190 that is targeted for use on tires sized for standard automobiles and light trucks, such as 255/70R15 or smaller tires. An embodiment of a tire seating device 190 designed for automobile tires may be able to use a 2.0-2.5 liter pressure vessel at 100 psi.

The pressure vessel 191 may be constructed of any material including, but not limited to, steel, iron, aluminum or another metal, a polymer such as poly-vinyl chloride (PVC) plastic, polycarbonate plastic such as Lexan® from SABIC Innovative Plastics, acrylonitrile butadiene styrene (ABS) plastic, or other suitable materials, depending on the targeted operating pressure, size, shape, weight, cost, or other design parameters of a particular embodiment. The end caps 192, 121 may be attached to the pressure vessel 191 using a method appropriate for the material used, including, but not limited to, welding, gluing, screw-threads, bolts, external clamps, or other methods to create a gas-tight seal. In some embodiments where the proximal end cap 192 is not flat, a flat stand may be attached to the proximal end cap 192 allowing the tire seating tool 190 to stand upright for storage.

The pressure vessel 191 may provide an input port 160 to accept pressurized gas into the primary gas reservoir 195 from an external source that may be connected to the input port 160. An input valve 161 controlled by the valve handle 162 may be included to open and/or close a pneumatic connection between the primary gas reservoir 195 and the input port 160 allowing pressurized gas to flow from the external source to the pressure vessel 191 if the input valve 161 is open, and sealing the pressure vessel 191 if the input valve 161 is closed. The input valve 161 may be any type of valve including, but not limited to a butterfly valve, a ball valve, or a poppet valve. In other embodiments, a check valve that allows gas to flow only in the direction into the primary gas reservoir 195 may be used as the input valve 161. The input port may be any type of connection suitable for a pressurized gas connection including, but not limited to, a quick-connect fitting, a Schrader or Presta valve, a threaded fitting, or other type of connection that may be held in place with screw threads, glue, a bayonet type mount, a quick-connect, welds, friction, or other methods that allow a gas-tight, or nearly gas-tight, seal to be formed as the primary gas reservoir 195 is pressurized.

The output fitting 122 may be connected to a tube 199 that is connected to a nozzle 100 on the distal end of the tube 199, pneumatically coupling the outlet 124 to the nozzle 100. The tube 199 may be connected to the output fitting 122 and the nozzle 100 using the threads or other types of connections. A handle 170 may extend radially from the tube 199. The handle 170 may be attached to the tube 199 by using straps 172 such as hose clamps around the tube 172 and a base 171 of the handle 170. Other methods, such as welding, gluing, or other methods, may be used to attach the handle 170 to the tube 199. Other embodiments may attach the handle 170 to the cylindrical pressure vessel 191, some embodiments may have a handle with a different shape and yet additional embodiments may not include a handle 170. Some embodiments may also include a strap to allow the tire seating tool 190 to be more easily carried.

A grip 140 is configured to extend radially from the pressure vessel 191, although the grip 140 may not be perpendicular to the longitudinal axis of the pressure vessel 191. In many embodiments, the grip 140 may have a length measured in a radial direction that is longer than the width or breadth of the grip 140. In some embodiments, the grip 140 may extend at about a right angle from the handle 170 (if a handle is included) as shown in FIGS. 1A and 1B (e.g., at 90 degrees+/−30 degrees). In other embodiments, the grip 140 and the handle 170 may extend in-line with each other or at some other angle. A release control 155 is typically located at a position close to the grip 140, such as within 15 centimeters (cm). In various embodiments, the release control 155 may be located in a position that it may be actuated using a finger of the same hand that is holding the grip 140, typically the user's index finger.

Although some embodiments may feature a simple cylindrical grip, other embodiments feature a grip 140 shaped similarly to that of a pistol gun as shown in FIG. 1B, referred to herein as a stylized pistol grip. A stylized pistol grip may be contoured to fit in a hand better than a simple cylindrical grip and may be textured to allow for more secure handling. The stylized pistol grip 140 may have a breadth measured in the axial direction of tire seating device that is longer than the width of the grip 140 and the length measured in the radial direction away from the pressure vessel 191 may be longer than either the width or breadth. The texturing may be achieved by providing grip plates affixed to each side of the grip 140 as shown in FIG. 1B with a textured surface designed to provide a more comfortable, secure grip when grasped in the palm of a user's hand. The stylized pistol grip 140 may also be angled toward the proximal end of the tire seating device to make it easier to grasp.

The release control 155 may be shaped like a trigger and positioned at a location similar to a trigger of the pistol grip. For embodiments with a trigger-shaped release control, the release control is actuated by squeezing it towards the pistol grip 140, in a manner akin to the trigger of a gun. A trigger guard 158 may also be provided to help lessen the chance of an accidental actuation of the release control 155. In some embodiments, instead of a trigger, the release control may be implemented as a button on the pistol grip 140 that may be actuated by pressing the button (or squeezing it with a finger) in a direction towards the pistol grip 140. Other embodiments may position the release control 155 in other locations within 15 centimeters (cm) of the grip 140 where it may still be actuated using the same hand that is holding the grip 140. In such embodiments the release control 155 may be shaped as a trigger, a button, a lever, a paddle, or have some other shape that may be pulled, pushed, touched, moved or otherwise manipulated to actuate the release control 155

The grip 140 may be attached to the pressure vessel 191 at various locations, anywhere from the back end cap 192 to the distal end cap 121. In some embodiments the grip 140 extends radially from the pressure vessel 191 at a point near the middle point, that is, halfway between end caps 121 and 192. In such embodiments the grip 140 may extend radially from a point within 15 cm either side of the middle point of pressure vessel 191, or in other embodiments, within any range less than 15 cm either side of the middle point (e.g., 12 cm, 10 cm, 5 cm, or the like). In some embodiments the grip 140 may attached at or near (e.g. within 15 cm or within some other larger or smaller range) the center of gravity of the tire seating device 190 which may be closer to the distal end of the cylindrical pressure vessel 191 due to the weight of the tube 199 and the nozzle 100. The grip 140 may be attached to the cylindrical pressure vessel 191 using any suitable technique for the materials used, including welding, bolting, gluing, threaded fittings, or other attachment techniques. Gaskets or other material may be required in certain locations around the grip 140 to seal seams or gaps so that pressurized gas cannot escape, such as the point where the conduit 141 passed through the wall of the pressurize vessel 191 and between the plenum 141 and the outside wall of the pressure vessel 191. Depending on the construction of the grip 140, additional gasket material may be used in the construction of the grip 140.

Referring now to the cross-sectional view of the tire seating device 190 of FIG. 1C, a gas valve 200 is included near the distal end of the cylindrical pressure vessel 191. In various embodiments, the gas valve 200 may be positioned inside the pressure vessel 191 to control a flow of gas from the outlet 124 on the distal end of the cylindrical pressure vessel 191 by opening in response to actuation of the release control 155 although other embodiments may position the gas valve 200 outside of the pressure vessel 191. If the gas valve 200 is opened, pressurized gas in the primary gas reservoir 195 may flow through the outlet 124, the tube 199, the nozzle 100 and out the nozzle outlet 114. In the embodiment shown, the gas valve 200 is pneumatically controlled using a conduit 141 that pneumatically couples a control reservoir in the gas valve 200 to a release valve 150 that may be opened by the actuation of the release control 155. If the release valve 150 is open, gas may flow from the control reservoir, through the conduit 141 and the release valve 150, and out the exhaust port 159 to the surrounding atmosphere. The operation of the pneumatically controlled gas valve 200 is discussed later in this specification. Other embodiments of the tire seating device 190 may use other types of gas valves to control the flow of gas from the outlet 124 including electrically operated valves, valves with a mechanical linkage from the release control 155 to open the gas valve, hydraulically controlled valves, or any other type of gas valve that may open quickly in response to actuation of the release control 155.

Figure 1D:
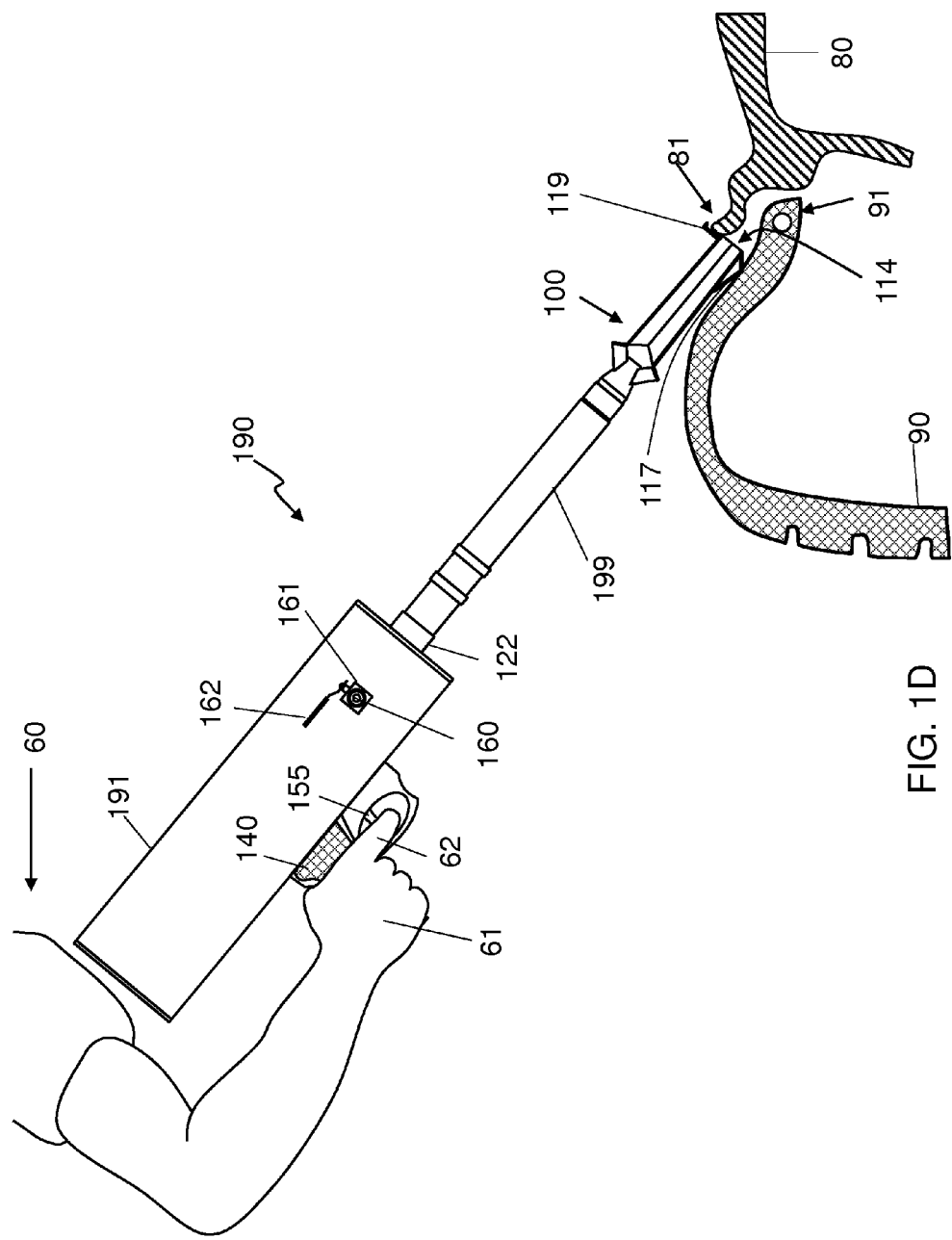
FIG. 1D shows an application of the tubeless tire seating device of FIG. 1A.

FIG. 1D shows the tire seating device 190 in use to seat a tire 90 on a rim 80. The tire seating device 190 includes a tank or cylindrical pressure vessel 191 that has been filled with a pressurized gas, such as air, nitrogen ($N_2$), argon (Ar), carbon dioxide ($CO_2$), or other gas. The cylindrical pressure vessel 191 may have been filled by connecting an external source of pressurized gas to the input port 161, and opening the input valve 161 by turning the input valve handle 162 to allow pressurized gas to flow into the pressure vessel 191. In some embodiments, a pressure gauge may be included to show the primary pressure of the gas in the pressure vessel 191 to the user 60.

The user 60 may hold the tire seating device 190 by using a hand 61 to hold the grip 140. The user 60 may use their other hand to hold the handle 170 (not shown), cylindrical pressure vessel 191, or tube 199 to provide even more stability. The user 60 may then maneuver the tire seating device 190 so that the nozzle is positioned toward the tubeless tire 90 on the rim 80 and position the rim bracket 119 against the lip 81 of the rim 80. This will position the nozzle outlet 114 between the rim 80 and the tire 90 mounted on the rim 80. A tire bumper 117 may push the tire 90 away from the edge of the nozzle outlet 114 to also help with getting the tire seating device 190 in the proper position.

The nozzle 100 is pneumatically coupled to the outlet 124 on the distal end of the pressure vessel 191 by the tube 199 that is fitted into the output fitting 122. With nozzle 100 pneumatically coupled to the outlet 124, pressurized air released from the outlet 124 of pressure vessel 191 can flow through the tube 199 and out of nozzle 100. The length of the tube 199 may be different for various embodiments but in some embodiments the length of the tube 199 may be long enough to allow the user 60 to position the rim bracket 119 against the lip 81 of a rim 80 that is lying on the floor without requiring the user 60 to stoop or bend over very far, and to keep the face of the user 60 far enough from the tire 90 that debris dislodged by the air may not hit the user 60 in the face. While the optimum length of the tube 199 may depend on the dimensions of the cylindrical pressure vessel 191 and/or the nozzle 100, a length of at least 30 cm for the tube 199 may provide an adequate distance for a 6 liter pressure vessel 191 that is 10-13 cm in diameter and 45-75 cm long. At least one embodiment may use a tube 199 that is 60 cm long with a pressure vessel 191 that has an internal diameter of 12 cm and is 55 cm long with the grip 140 located near the middle of the pressure vessel 191.

The user 60 may then use a finger 62 of the hand 61 that is holding the grip 140 to actuate the release control 155 which may be shaped and positioned like a trigger on a pistol grip. In other embodiments, the release control 155 may be located in a different position and may be actuated differently. The actuation of the release control 155 may open the gas valve 200 to allow the pressurized gas of the primary gas reservoir 195 in the pressure vessel 191 to flow through the outlet 124 on the distal end of the cylindrical pressure vessel 191, through the tube 199 and the nozzle 100 to create a stream of gas out of the nozzle outlet 114. The stream of gas flows between the lip 81 of the rim 80 and the bead 91 of the tire 90 into the tire 90. The large volume of air that may be quickly blown into the tire 90 may create a pressure differential between the pressure of the air inside the tire 90 and the ambient air pressure, pushing the bead 91 against the lip 81 to seal the tire 90 to the rim 80 and allowing the tire 90 to be fully inflated to a proper operating pressure. In some embodiments, a pressurized air source may be connected to the valve stem of the rim 80 while actuating the release control 155 and seating the tire 90 on the rim 80 to facilitate the operation of inflating the tire and provide yet another source of air to help create the pressure differential between the inside of the tire 90 and the outside air.

In some embodiments, the nozzle 100 may use the Venturi effect and/or Bernoulli principle to draw atmospheric air into the nozzle 100 as the stream of gas flows through the nozzle 100 to increase the volume of air the is blown into the tire 80. Other embodiments of the nozzle may incorporate an outlet design that utilizes the Venturi effect and/or Bernoulli principle to draw atmospheric air into the tire that does not flow through the nozzle. Either of these nozzle designs may increase the overall efficiency of the tire seating device 190 and allow a smaller pressure vessel 191 to be used for a given size of tire 90 than would be required if a more conventional nozzle is used.

The grip 140 extending radially from the cylindrical pressure vessel 191 with the outlet 124 located on the distal end of the pressure vessel 191 may allow for easier handling of the tire seating device 190 as compared to conventional designs. The smaller size of the pressure vessel 191 as compared to conventional designs due to the efficiency offered by the gas valve 200 and the nozzle 100 may allow for a lighter weight of the tire seating device 190. The smaller size and lighter weight of the cylindrical pressure vessel 191 may also make it easier for a person to use the tire seating device 190. In many cases, a user 60 may be able to handle the tire seating device 190 with one hand 61 holding the grip 140 and keeping their other hand free. The design of the tire seating device 190 also allows a user 60 to keep their face at a good distance from the tire 90 and rim 80. This may be desirable as dust, water and other debris may be dislodged from the tire 90 due to the high velocity and volume or air released from the tire seating device 190 which may blow back toward the user 60

Figure 2A:
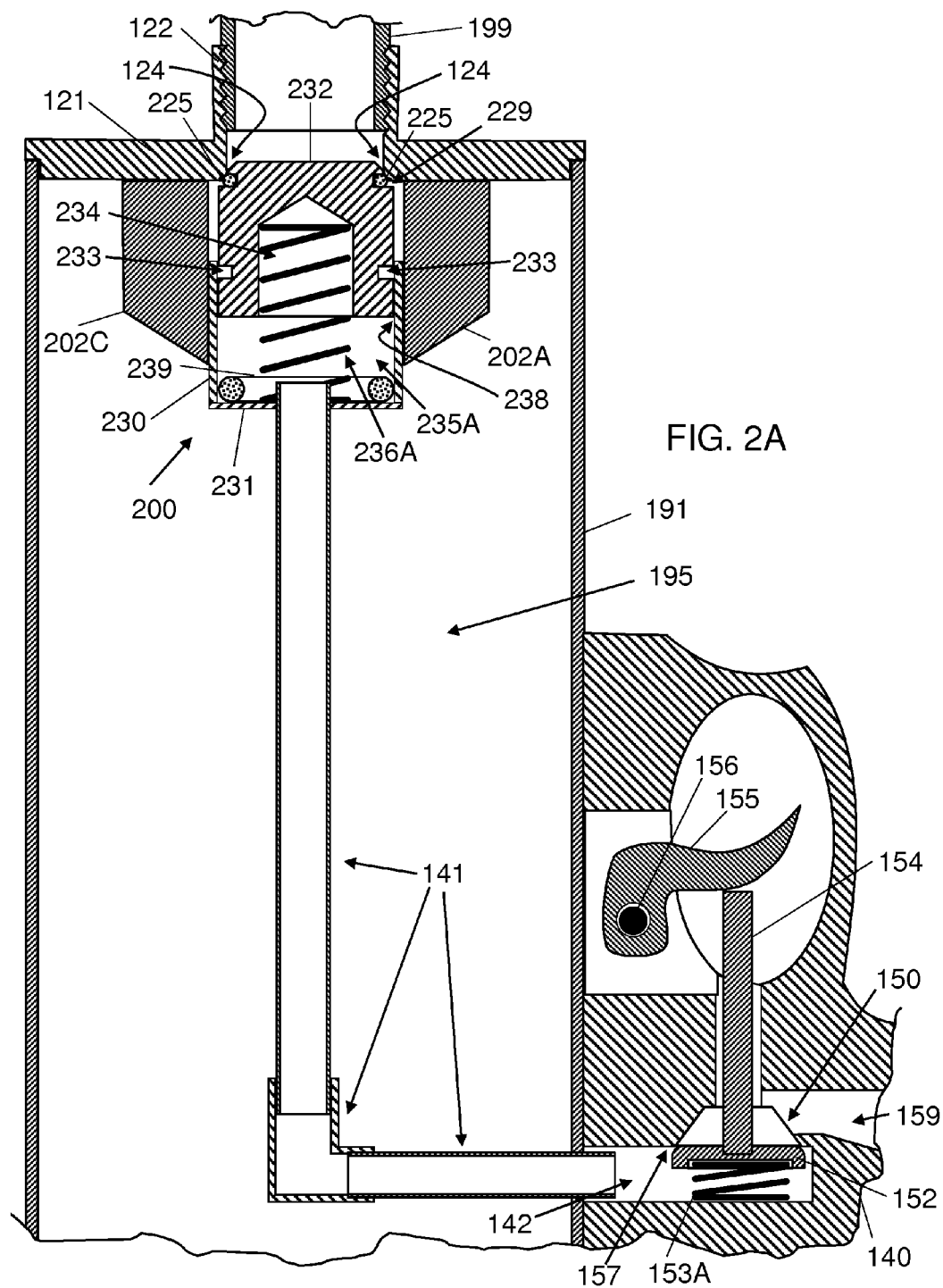
FIG. 2A shows a cross-sectional side view of a gas valve used in the tubeless tire seating device of FIG. 1A in a closed position.
Figure 2B:
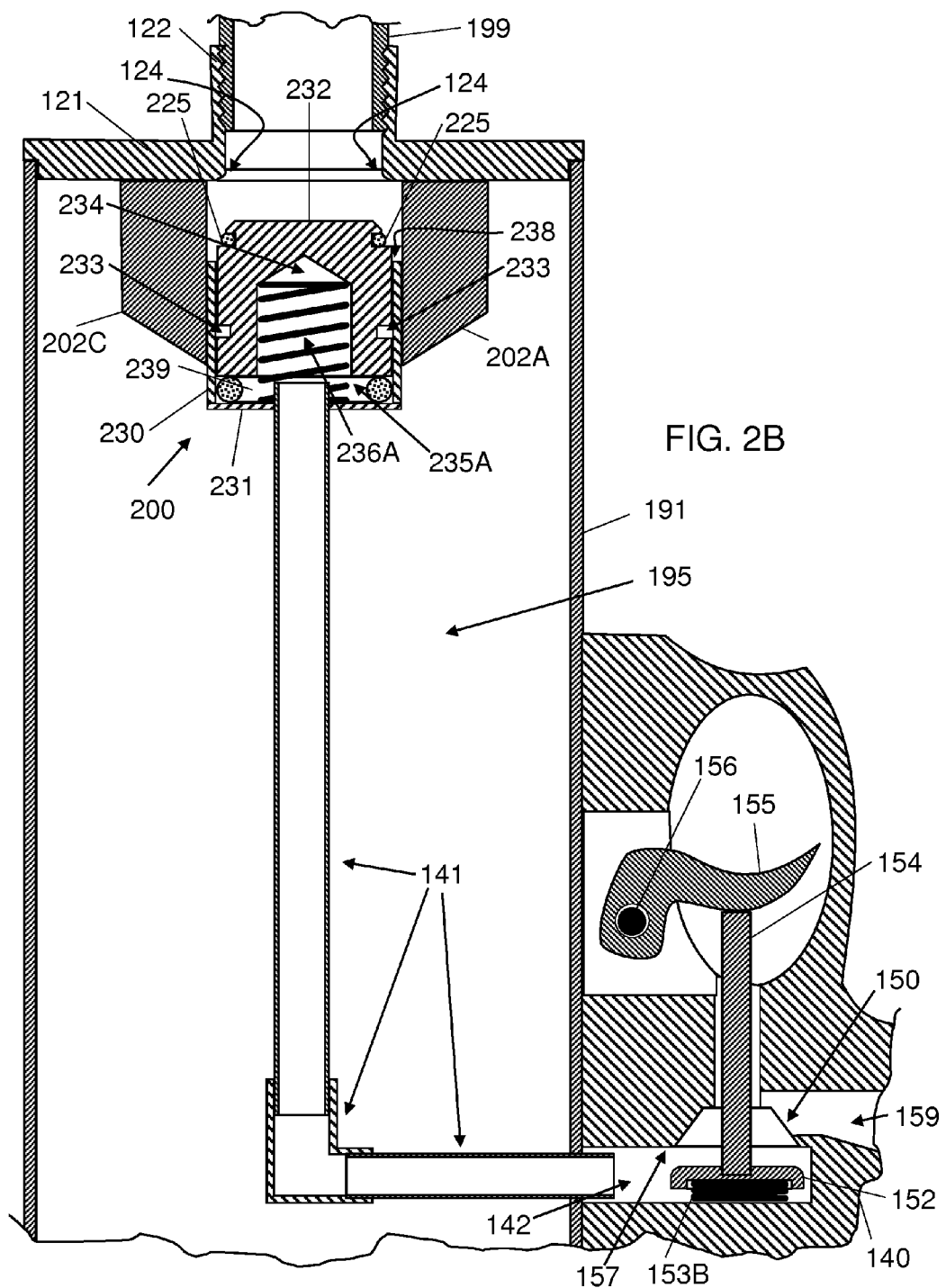
FIG. 2B shows a cross-sectional side view of a gas valve used in the tubeless tire seating device of FIG. 1A in an open position.

FIGS. 2A and 2B shows a cross-sectional side view taken from the perspective of cross-sectional cutting plane C:C of FIG. 1A. FIG. 2A depicts the gas valve 200 in a closed position. A piston 232 may be seated against the primary gas outlet 124 to block gas from leaving the primary gas reservoir 195 through the outlet 124. A gasket or rubber O-ring 225, or other type of seal may be positioned on the piston 232 where it seats against the outlet 124 although other embodiments may position an O-ring on the outlet 124 instead. Other embodiments may not require the use of an O-ring 225, depending on the materials used for the piston 232 and the outlet 124 and manufacturing tolerances of the various parts. The piston 232 may be made of any suitable material including, but not limited to steel, iron, aluminum or another metal, PVC, polycarbonate, ABS, and polyacetal polymers such as polyoxymethylene including Delrin® acetal resin from DuPont.

The piston 232 may be shaped to fit into a cylinder 230 with a closed end 231. As can be seen in comparing FIG. 2A and FIG. 2B the piston 232 is configured to slide back and forth within the cylinder 230. A large O-ring 239 may be included at the back of the cylinder 230 to provide a cushion for the piston 232 as the piston 232 slides back into the cylinder 230 quickly. The device is configured so the chamfered end of piston 232 (i.e., the end opposite spring 236A) can slide beyond the edge of the cylinder 230 to press its rubber O-ring 225 against the outlet 124. The other end of piston 232 remains within the cylinder 230 and is acted upon by the force of the spring 236A and the control pressure within the control reservoir 235A.

The cylinder 230 may be positioned by supports 202A, 202C to allow the piston 232 to slide into position to seal the primary gas outlet 324. The number of supports may vary between embodiments although most embodiments may have 3 or 4 supports and supports 202B and 202D are not visible in FIG. 2A. The supports 202A, 202C may be fixed to both the outer wall of the cylinder 230 and the distal end cap 121 using welding, glue, bolts, or other attachment mechanisms depending on the materials used and the details of the embodiment. In other embodiments, the supports may be fixed to the outer wall of the cylinder 230 and the inner wall of the cylindrical pressure vessel 191. A compressed spring 236A may be positioned between the closed end of the cylinder 231 and the piston 232 to provide force to help keep the piston 232 seated against the outlet 124. In some embodiments, the piston 232 may have a cavity 234 for positioning the compressed spring 236A and providing room for the spring 236A/B as the piston 232 moves toward the closed end 231. The piston 232 may include an annular slot 233 for a piston ring. Some embodiments may include a piston ring in the annular slot 233 that may be fitted around the piston 232 to create a tighter seal than could otherwise be created between the piston 232 and cylinder 230 alone.

In at least one embodiment, the cylinder 230, supports 202 and the output fitting 122 may be cast, machined, or otherwise created as a unified part that can be inserted into the distal end cap 121 and then welded or otherwise fixed in place. The unified part is designed to allow the piston 232 to be inserted into the cylinder 230 through the output fitting 122. A separate part acting as the outlet 124 may then be screwed into threads cut into the output fitting 122. The separate part acting as the outlet 124 has an opening with a diameter less than the piston 232 so that the O-ring 225 can press against the outlet 124 and create a gas-tight seal if the piston 232 is pressed against the outlet 124. A construction of this type allows for servicing the piston 232 and/or O-ring 225 simply by unscrewing the tube 199 from the output fitting 122 and the unscrewing the separate part acting as the outlet 124, allowing the piston 232 to be removed through the output fitting 122.

A control reservoir 235A may be created between the closed end 231 of the cylinder 230 and the piston 232. The primary gas reservoir 195 is much larger in volume than the control reservoir 235A. The piston 232 and control reservoir 235A are typically located on the same side of the outlet 124 as the primary gas reservoir 195. As such, the piston 232 may be thought of as holding the valve closed from within the primary gas reservoir 195, rather than from the outside of the reservoir 195 (e.g., rather than from outside of outlet 124). The volume of the control reservoir 235A depends on the position of the piston 232 within the cylinder 230 with the largest volume of the control reservoir 235A occurring if the piston 232 is seated against the outlet 124 as shown in FIG. 2A. A conduit 141 may pneumatically couple the control reservoir 235A and a plenum 242 in the grip 140, allowing gas to flow between the control reservoir 235A and the plenum 142. The conduit 141 may include tubing, pipe, fittings or other hardware. The conduit 141 may exit the pressure vessel 191 through the wall of the pressure vessel 191. The exit point may be sealed using a rubber seal, gasket, glue, welding or other method so that gas cannot escape from the pressure vessel 191 around the conduit 141. The grip 140 may be fabricated differently in various embodiments but one embodiment may fabricate the grip 140 using two "clamshell" halves that are then attached using screws, glue, welding or other methods and may use a gasket between the two halves to help create a gas-tight seal.

A release valve 150 may be positioned to have an input pneumatically coupled to the control reservoir 135A via the plenum 142 and the conduit 141. The output of the release valve 150 may be pneumatically coupled to the exhaust port 159. The release valve 150 may be a poppet valve as shown or may be any type of gas valve in other embodiments. The release valve 150 may include a valve body 152 configured to mate with valve seat 157 to form a gas-tight seal. Spring 153A may provide force to keep the valve body 152 seated against the valve seat 157. A rod 154 may mechanically couple the release control 155 to the valve body 152.

As the primary gas reservoir 195 is filled with pressurized gas through the input port 160, as long as the gas enters the pressure vessel 191 at a relatively slow rate so as to take at least several seconds to fill the pressure vessel 191 to the primary pressure (e.g., three seconds or more), gas may pass between the cylinder 230 and the piston 232 and may pressurize the control reservoir 235A. In the embodiment shown, a slight gap between the piston 232 and the cylinder 230 may be left to allow small quantities of gas to pass between the primary gas reservoir 195 and the control reservoir 235A. Other means may be provided to pressurize the control reservoir 235A as may be shown in additional embodiments of gas valves described in this specification or by other methods not described in detail. As the gas pressurizes the primary gas reservoir 195 and the control reservoir 235A, the primary gas reservoir 195 may be at a slightly higher pressure than the control reservoir 235A but once the input valve 161 is turned off and gas is no longer entering the primary gas reservoir 195, the control reservoir 235A may quickly come to equilibrium with the primary gas reservoir 195.

If the gas valve 200 is in the closed state as shown in FIG. 2A, the pressure at the output 124 may typically be at standard atmospheric pressure. Other pressure levels are measured with respect to the pressure of the surrounding atmosphere.

The closing forces operating on the piston 232 include the force of the compressed spring 236A and the force of the gas in the control reservoir 235A operating on the piston 232 which is equal to the control pressure times the cross-sectional area of piston 232 at its largest point which will be referred to hereinafter as the piston area. The opening forces on piston 232 include the force of any pressure at the outlet 124 times the cross-sectional area of the of the outlet 124, hereinafter referred to as the outlet area, and the force of the gas in the primary gas reservoir 195 operating on the piston 232 which is equal to the primary pressure times the difference in the piston area and the outlet area. The area represented by the difference in the piston area and the outlet area can be seen as an annular ring 229.

The various embodiments featuring a pistol grip (e.g., the grip 140 with a triggering mechanism for the valve release) allow the user to hold and manipulate the tank with one outstretched hand to direct the nozzle between the tire and rim, while keeping the nozzle safely away from the user's face. The gas valve 200 may be opened by opening the release valve 150 by pushing on the release control 155, causing it to rotate around the pivot 156 and push on the rod 154, Movement of the rod 154 may move the valve body 152 away from the valve seat 157 which also compresses the spring 153B as the release valve 150 opens. Opening the release valve 150 allows the pressurized gas in the control reservoir 235A to pass through the conduit 241, the plenum 242, the open release valve 250, and the exhaust port 259. As long as this path is much larger than the gap between the piston 232 and the cylinder 230, the gas will escape from the control reservoir 235A much faster than it can be replaced from the primary gas reservoir. This may cause the control pressure to drop toward the surrounding atmospheric pressure. As the control pressure drops, the closing force on the piston 232 is reduced. If the control pressure drops to a release pressure, the opening force on the piston 232 may exceed the closing force and the piston 232 may begin to slide within the cylinder 230 and allow gas to escape through the outlet 124 which may increase the pressure at the outlet 124. This increases the opening force on the piston 232 and even though the control reservoir 235A is being made smaller and the compressed spring 236A is being further compressed, both of which may increase the closing force on the piston 232, the increased opening force overcomes the closing force and the piston 232 slides rapidly into the cylinder 230, quickly opening the gas valve 200. In the inventor's estimation, many embodiments may open in less than 0.10 seconds (s) and some embodiments may open in a few tens of milliseconds (ms) such as 20-50 ms although other embodiments may open even faster and some may open more slowly than 0.10 seconds (e.g., up to 0.35 seconds, or so).

Referring now to FIG. 2B which shows cross sectional views of the gas valve 200 in an open position, the piston 232 has slid into the cylinder 230 to allow the gas to escape through the outlet 124. As long as the release valve 150 is held open with enough force to overcome the closing force of the spring 153B, the control reservoir 135B, now much smaller due to the position of the piston 232, may be at or near the pressure of the surrounding atmosphere, so that the only closing force on the piston is from the more compressed spring 136B. As long there is enough gas in the primary gas reservoir 195 to continue to create enough primary pressure so that the primary pressure times the piston area is greater than force from the more compressed spring 236B, the gas valve 200 will tend to remain open.

Once enough gas has escaped from the primary gas reservoir 195 through the outlet 124 that the force from the spring 235B (which is compressed when the valve is open) exceeds the primary pressure acting on the piston area, the piston 232 may slide against the outlet 124, closing the gas valve 200. The closure of the gas valve 200 due to pressure of spring 235B when the pressure within primary gas reservoir 195 falls to a sufficiently low level can occur independent of the position of the release valve 150, that is, with the release valve 150 either open or closed.

The gas valve 200 may be built with various dimensions in various embodiments designed for use in different applications. In one embodiment consistent with the 6 liter pressure vessel 191 described above, the output fitting 122 may be designed to mate with 1.5 inch (in.) threaded pipes. The inside diameter of the cylindrical cylinder 230 may be in a range from 1.6 in. to over 2.25 in. with one embodiment using a cylinder with an inside diameter of about 1.8 in. for the cylinder. Based on the inventor's experiments, if the cross-sectional area of the inside of the cylinder 230 is at least 10% larger than the area of the outlet 124, the gas valve 200 operates well. Other embodiments may use a wide range of sizes for the outlet 124 and for the cylinder 230, for example, in some embodiments the cylinder 230 size may vary within the range of 0.25 inch to 12 inches, with correspondingly sized outputs and fittings. In yet other embodiments the diameter of the cylindrical pressure vessel 191 can be any size as long as enough space is left between the cylinder 230 and the walls of the pressure vessel 191 for the free flow of gas. The conduit 141 may be of various sizes but some embodiments may use a ¼ in. and others may use ½ in. pipe and fittings. Other embodiments may use larger pipes or tubes with various fittings.

FIGS. 3A-B, and 4A-D all show the same alternative embodiment of a pneumatically controlled, rapid-opening, gas valve 300 that may be suitable for use in various embodiments of a tubeless tire seating device or may have other uses. Therefore, the same reference numbers are used throughout these drawings and reference may be made to the various drawings in the description. The embodiment shown is for a stand-alone gas valve 300 but one of ordinary skill may easily understand how to adapt the gas valve 300 to integrate it directly into the cylindrical pressure vessel of an embodiment similar to that shown in FIG. 1A-D.

The gas valve 300 may have a cylindrical body 301 with two end-caps 311, 321 attached to the body 301 to form a primary gas reservoir 305. In other embodiments, the primary gas reservoir 305 may be formed with other configurations of parts and may have other shapes such as spherical, cubic, conical, or other volumetric shapes. In the embodiment shown, the end caps 311, 321 and the body 301 may be made of steel, iron, aluminum or another metal, a polymer such as poly-vinyl chloride (PVC) plastic, polycarbonate plastic such as Lexan® from SABIC Innovative Plastics, acrylonitrile butadiene styrene (ABS) plastic, or other suitable materials, depending on the targeted operating pressure, size, shape, weight, cost, or other design parameters of a particular embodiment. The end caps 311, 321 may be attached to the body 301 using a method appropriate for the material used, including, but not limited to, welding, gluing, screw-threads, bolts, external clamps, or other methods to create a gas-tight seal.

The input end cap 311 may have a primary gas input opening 310 formed by an input fitting 312 with threads 313 to accept gas into the primary gas reservoir 305 from an external source such as an external pressure vessel that may be connected to the input fitting 312. The input source may be connected to the gas valve 300 using other types of connections in some embodiments including, but not limited to, a quick-connect fitting, a sleeve fitting, or other type of connection that may be held in place with screw threads, glue, a bayonet type mount, a quick-connect, welds, friction, or other methods that allow a gas-tight, or nearly gas-tight, seal to be formed as the primary gas reservoir is pressurized. The output end cap 321 may have a primary gas outlet opening 320 formed by an output fitting 322 with threads 323. An output conduit may be connected to the output fitting 322 using the threads 323 or other types of connection as described above for the input fitting 312.

A control block 340 may be attached to the body 301 by bolts, welding, gluing or other attachment methods. In some embodiments, the control block 340 may be shaped as a handle or grip such as a pistol grip. A fill valve 360, a Schrader valve in the embodiment shown, may extend from the control block 340. A release valve button 355 may also be accessible and an exhaust port 359 may also be seen on one end of the control block 340. In some embodiments the control block 340 may be located away from the valve body 301 in order to control the valve from a distance. In such embodiments the control block 340 is connected to the valve by the conduit 341 which is configured to extend away from body 301.

Figure 3A:
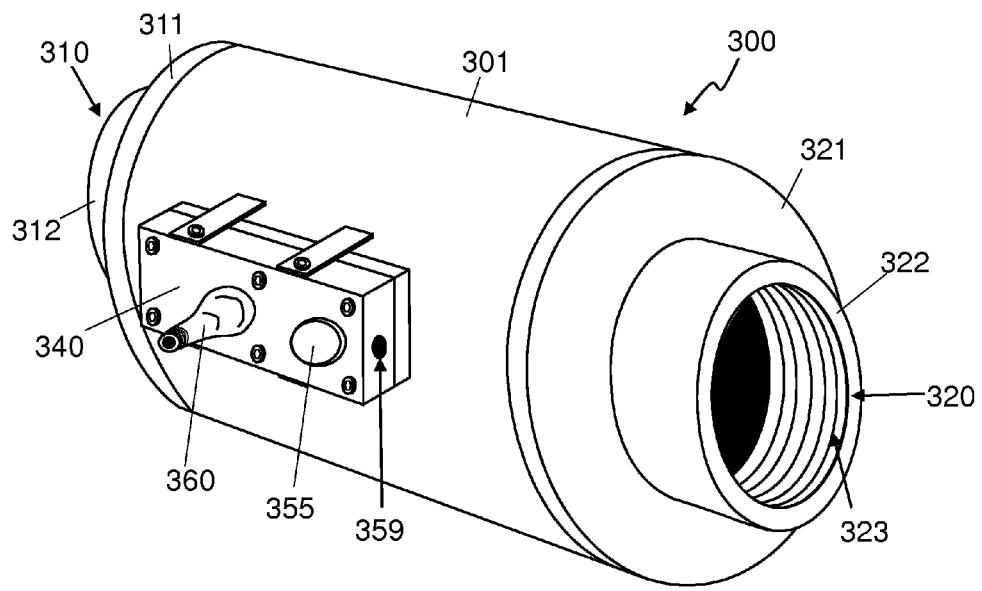
FIG. 3A shows an isometric view of an embodiment of a pneumatically controlled, rapid-opening, gas valve.
Figure 3B:
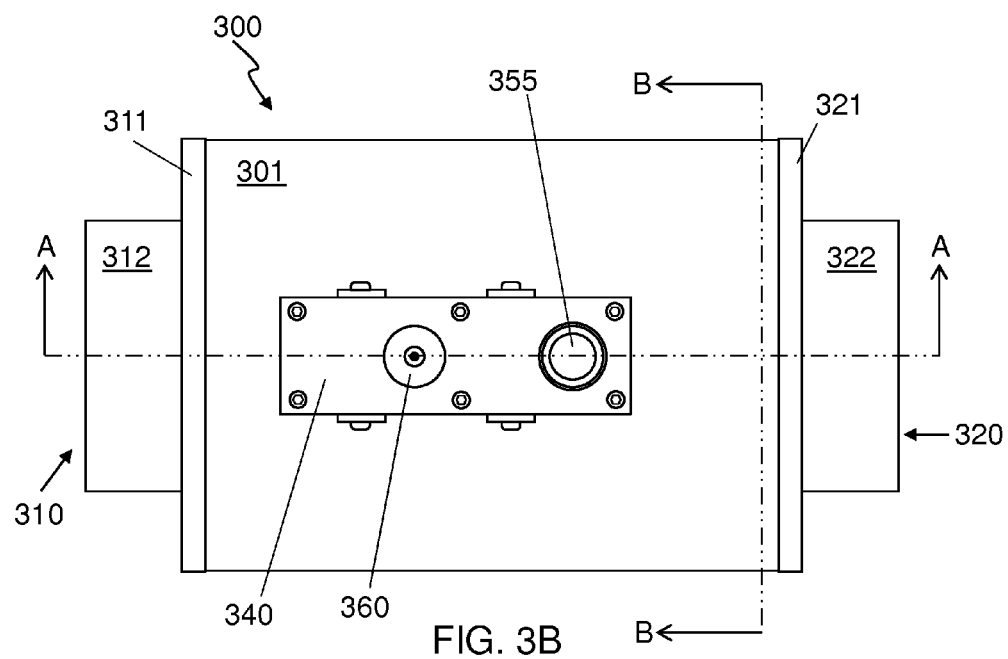
FIG. 3B shows a top plan view of the gas valve of FIG. 3A.

FIG. 3B also shows two cross-sectional cutting planes. Cross-sectional cutting plane A:A shows the approximate position of the plane used for the cross-sectional views of FIGS. 4A and 4C. The cross-sectional views of FIGS. 5A, 6, 7, 8 and 9B are from a similarly positioned cutting plane in their associated embodiments. Cross-sectional cutting plane B:B shows the approximate position of the plane used for the cross-sectional views of FIGS. 4B and 4D and the cross-sectional view of FIGS. 5B and 9C and are from a similarly positioned cutting plane in their associated embodiments.

Figure 4A:
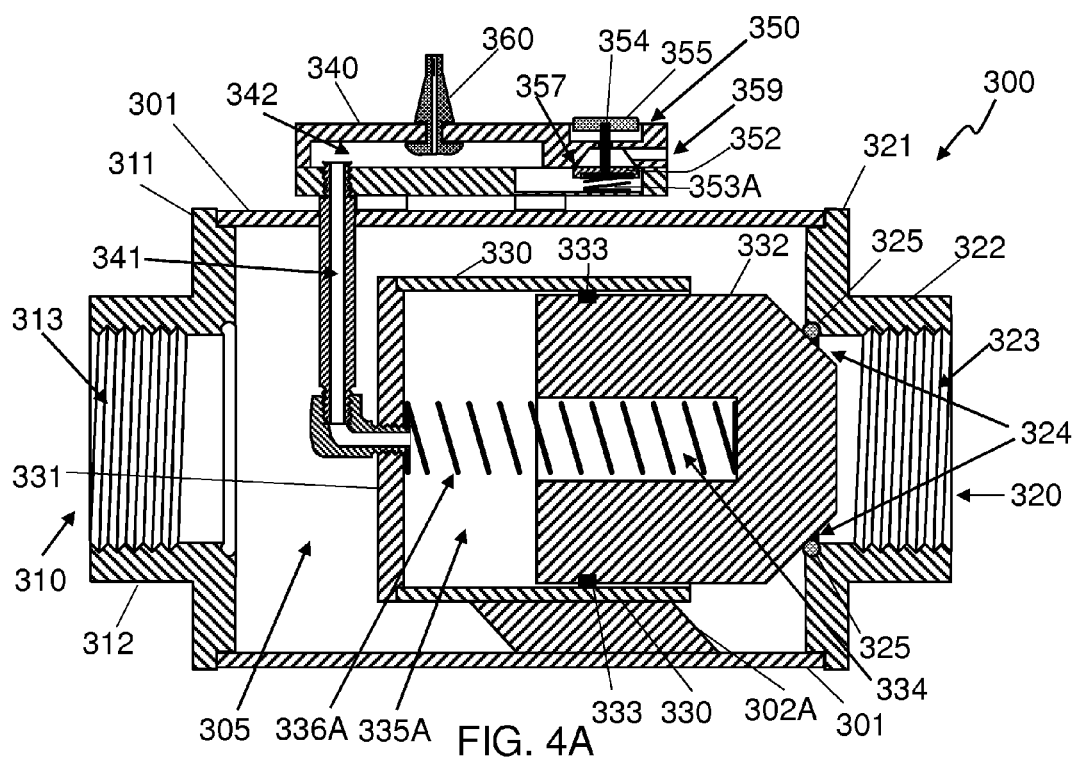
FIG. 4A shows a cross-sectional side view and FIG. 4B shows a cross-sectional front view of the gas valve of FIG. 3A in a closed position.
Figure 4B:
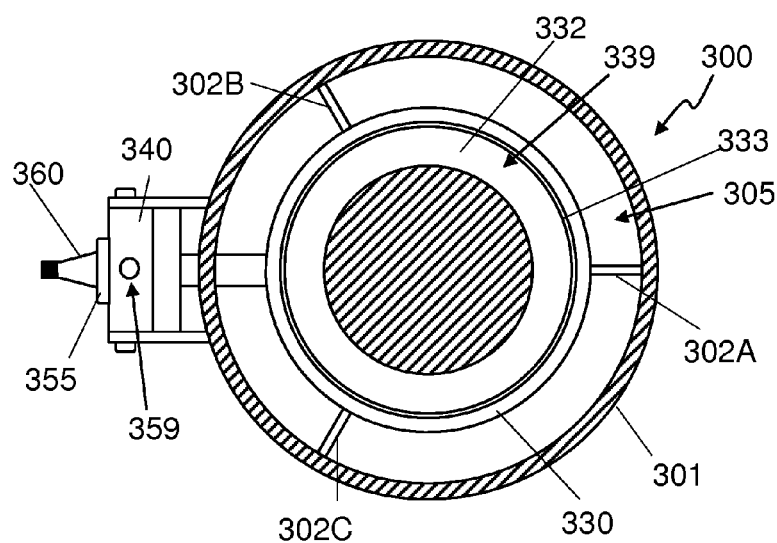

FIG. 4A shows a cross-sectional side view taken from the perspective of cross-sectional cutting plane A:A of FIG. 3B. FIG. 4B shows a cross-sectional front view taken from the perspective of cross-sectional cutting plane B:B of FIG. 3B. FIG. 4B depicts the gas valve 100 in a closed position. A piston 332 may be seated against the primary gas outlet 324 to block gas from leaving the primary gas reservoir 305 through the primary gas outlet opening 320. A gasket, rubber O-ring 325, or other type of seal may be positioned at the primary gas outlet 324 although other embodiments may position an O-ring on the piston 332 instead. Other embodiments may not require the use of an O-ring 325, depending on the materials used for the piston 332 and the primary gas outlet 324 and manufacturing tolerances of the various parts. The piston 332 may be made of any suitable material including, but not limited to steel, iron, aluminum or another metal, PVC, polycarbonate, ABS, and polyacetal polymers such as polyoxymethylene including Delrin® acetal resin from DuPont.

The piston 332 may be shaped to fit into a receptacle 330 with a closed end 331 and slide in a reciprocating motion in the receptacle 330. As can be seen in comparing FIG. 4A and FIG. 4C the piston 332 is configured to slide back and forth within the cylindrical receptacle 330. The device is configured so the chamfered end of piston 332 (i.e., the end opposite spring 336A) can slide beyond the edge of receptacle 330 to press against the rubber O-ring 325 or other seal positioned at the primary gas outlet 324. The other end of piston 332 remains within the cylinder receptacle 330 and is acted upon by the force of the spring 336A and the control pressure within the control reservoir 335A.

The receptacle 330 and piston 332 may be cylindrical in shape with a circular cross-section or in other embodiments may have other cross-sectional shapes such octagonal, square, ellipsoid, or other shapes. The receptacle 330 may be positioned by supports 302A, 302B, 302C to allow the piston 332 to slide into position to seal the primary gas outlet 324. The number of supports may vary between embodiments. The supports 302A, 302B, 302C may be fixed to both the outer wall of the receptacle 330 and the inner wall of the body 301 using welding, glue, bolts, or other attachment mechanisms depending on the materials used and the details of the embodiment. In other embodiments, the supports may be fixed to the outer wall of the receptacle 330 and the output end cap 321. A compressed spring 336A may be positioned between the closed end of the receptacle 331 and the piston 332 to provide force to help keep the piston 332 seated against the primary gas outlet 324. In some embodiments, the piston 332 may have a cavity 334 for positioning the compressed spring 336A and providing room for the spring as the piston 332 moves toward the closed end 331.

In some embodiments, several of the identified components may be cast and/or machined as a single part, such as a part that includes the receptacle 330, the closed end 331, the supports 302A-C and the end cap 321. In such an embodiment, the spring 336A and piston 332 could be inserted into the receptacle 330 and then the output fitting 322 including the primary gas outlet 324 added to the end cap 321 using threads, welding, glue, or some other attachment means.

The piston 332 may include one or more piston rings 333 that may be fitted around the piston 332 or may be an integral part of the piston 332 and may be interposed between the piston 332 and the receptacle 330 to create a tighter seal than could otherwise be created between the piston 332 and receptacle 330 alone. It may be advantageous in some embodiments to create a tight seal between the receptacle 330 and the piston 332 while still providing for low friction between the receptacle 330 and the piston 332. The piston ring 333 may be made of a material to help minimize the friction and create a good seal such as polyacetal, nylon, leather, rubber, or other material depending on the materials used for the piston 332 and the receptacle 330.

A control reservoir 335A may be created between the closed end 331 of the receptacle 330 and the piston 332. The piston 332 and control reservoir 335A are typically located on the same side of the primary gas outlet opening 320 as the primary gas reservoir 305. As such, the piston 332 may be thought of as holding the valve closed from within the primary gas reservoir 305, rather than from the outside of primary gas reservoir 305 (e.g., rather than from outside of primary gas outlet opening 320). The volume of the control reservoir 335A depends on the position of the piston 332 within the receptacle with the largest volume of the control reservoir 335A occurring if the piston 332 is seated against the primary gas outlet 324 as shown in FIG. 4A. A conduit 341 may pneumatically couple the control reservoir 335A and a plenum 342 in the control block 340, allowing gas to flow between the control reservoir 335A and the plenum 342. The conduit 341 may include tubing, pipe, fittings or other hardware. Gas flowing through the conduit 341 should not be considered as flowing though the primary gas reservoir 305 as the conduit 341 creates a separation between the gas in the conduit 341 and the primary gas reservoir 305. The conduit 341 may exit through the body 301. The exit point may be sealed using a rubber seal, gasket, glue, welding or other method so that gas cannot escape from the primary gas reservoir 305 around the conduit 341. The control block 340 may be fabricated differently in various embodiments but one embodiment may fabricate the control block 340 using a top section and a bottom section that are then attached using screws, glue, welding or other methods.

A release valve 350 may be positioned to have an input pneumatically coupled to the control reservoir 335A via the plenum 342 and the conduit 341. The output of the release valve 350 may be pneumatically coupled to the exhaust port 359. The release valve 350 may be a poppet valve as shown or may be any type of gas valve in other embodiments including, but not limited to, a ball valve, a butterfly valve, a diaphragm valve, or other type of valve that may be manually, electrically, pneumatically, hydraulically, or otherwise controlled. The release valve 350 may include a valve body 352 configured to mate with valve seat 357 to form a gas-tight seal. Spring 353A may provide force to keep the valve body 352 seated against the valve seat 357. A rod 354 may connect the valve body 352 to the release button 355.

The fill valve 360, which may also be called a control gas inlet, allows gas from an external source to enter the plenum 340 and flow through the conduit 341 into the control reservoir 335A without first flowing through the primary gas reservoir. As the control reservoir 335A is pressurized to a control pressure, the gas in the control reservoir 335A provides additional force on the piston 332 to push the piston 332 against the primary gas outlet 324. The control reservoir 335A may be filled with gas and pressurized using various methods in various embodiments, some of which are described below.

The gas reservoir of high pressure gas that is released by the valve is, in practice, typically much larger in volume than control reservoir 335A. This may be achieved by connecting primary gas reservoir 305 to a source of pressurized gas via the primary gas input opening 310. The source of pressurized gas may be a tank or other reservoir, or a high pressure gas line, that connects to primary gas reservoir 305 via primary gas input opening 310. Gas may enter the primary gas reservoir 305 using various methods in various embodiments but in the embodiment shown in FIG. 4A-D, the gas may enter through the primary gas input opening 310 to pressurize the primary gas reservoir 305 to a primary pressure. If the gas valve 300 is in the closed state as shown in FIG. 4A, in many applications the pressure at the primary gas output opening 320 may typically be at standard atmospheric pressure although in some embodiments, the pressure at the primary gas output opening 320 may be at some other pressure level although the calculations below are based on the pressure at the primary gas outlet opening 320 being at the pressure of the surrounding atmosphere if the gas valve 300 is closed. Other pressure levels are measured with respect to the pressure of the surrounding atmosphere.

The closing forces operating on the piston 332 include the force of the compressed spring 336A and the force of the gas in the control reservoir 335A operating on the piston 332 which is equal to the control pressure times the cross-sectional area of piston 332 at its largest point which will be referred to hereinafter as the piston area. In many embodiments, the piston area may be equal to the cross-sectional area of the piston at the piston ring 333. The opening forces on piston include the force of any pressure at the primary gas outlet opening 320 times the cross-sectional area of the of the primary gas outlet opening 320, hereinafter referred to as the outlet area, and the force of the gas in the primary gas reservoir 305 operating on the piston 332 which is equal to the primary pressure times the difference in the piston area and the outlet area. The area represented by the difference in the piston area and the outlet area can be seen as the annular ring 339 in FIG. 4B.

The gas valve 300 may be opened by opening the release valve 350 by pushing on the release button 355 which uses the rod 354 to move the valve body 352 away from the valve seat 357 which also compresses the spring 353B. Opening the release valve 350 allows the pressurized gas in the control reservoir 335A to pass through the conduit 341, the plenum 342, the open release valve 350, and the exhaust port 359. This may cause the control pressure to drop toward the surrounding atmospheric pressure. As the control pressure drops, the closing force on the piston 332 is reduced. If the control pressure drops to a release pressure, the opening force on the piston 332 may exceed the closing force and the piston 332 may begin to slide within the receptacle 330 and allow gas to escape through the primary gas outlet 324 which may increase the pressure at the primary gas outlet 324. This increases the opening force on the piston 332 and even though the control reservoir 335A is being made smaller and the compressed spring 336A is being further compressed, both of which may increase the closing force on the piston 332, the increased opening force overcomes the closing force and the piston 332 slides rapidly into the receptacle, quickly opening the gas valve 300. In the inventor's estimation, many embodiments may open in less than 0.10 seconds (s) and some embodiments may open in a few tens of milliseconds (ms) such as 20-50 ms although other embodiments may open even faster and some may open more slowly than 0.10 seconds (e.g., up to 0.35 seconds, or so).

Figure 4C:
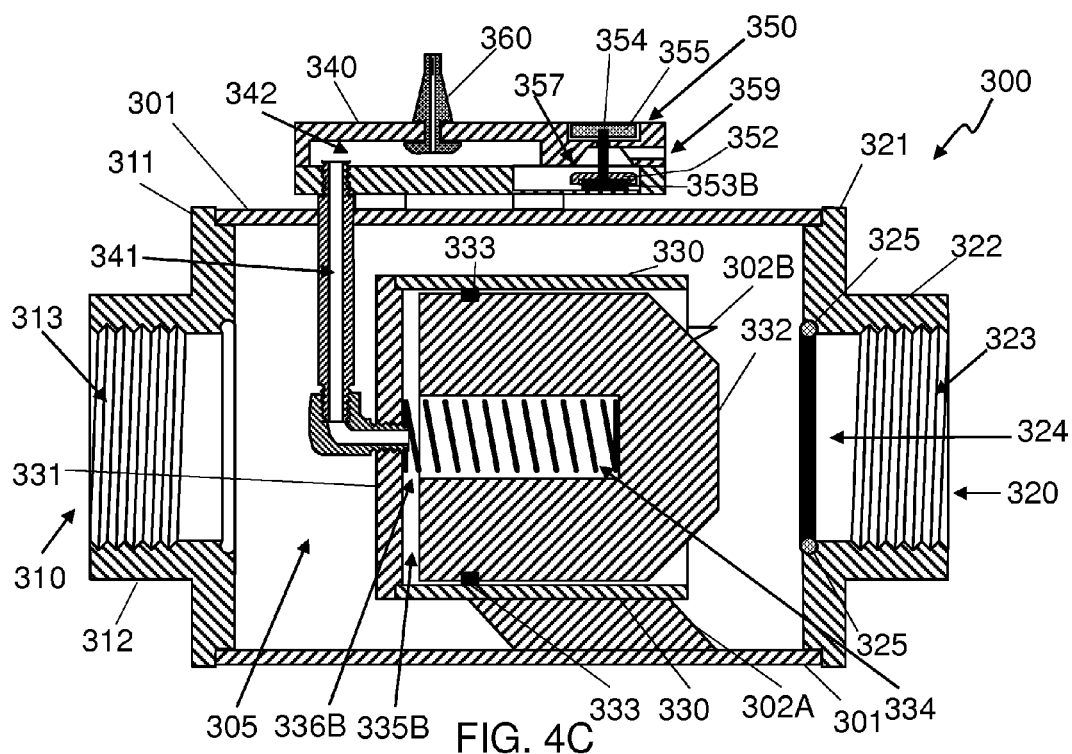
FIG. 4C shows a cross-sectional side view and FIG. 4D shows a cross-sectional front view of the gas valve of FIG. 3A in an open position.
Figure 4D:
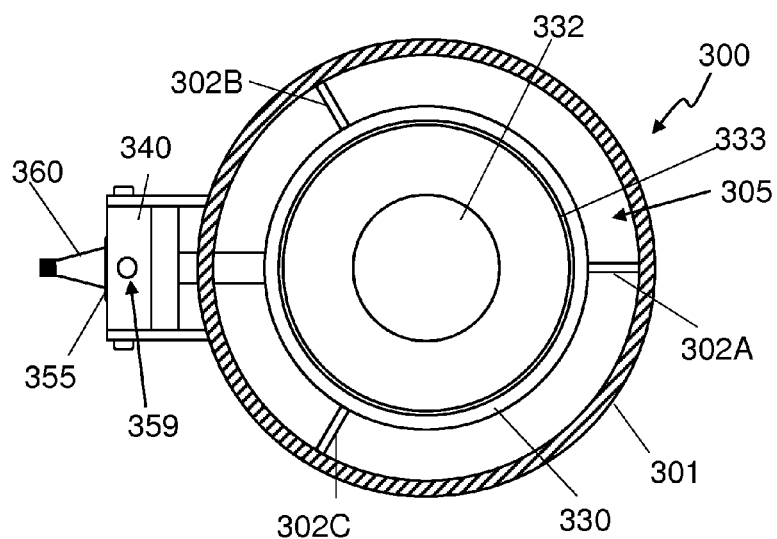

Referring now to FIGS. 4C and 4D which show cross sectional views of the gas valve 300 in an open position, the piston 332 has slid into the receptacle 330 to allow the gas to escape through the primary gas outlet 324. As long as the release valve 350 is held open with enough force to overcome the closing force of the spring 353B, the control reservoir 335B, now much smaller due to the position of the piston 332, may be at or near the pressure of the surrounding atmosphere, so that the only closing force on the piston is from the more compressed spring 336B. As long as enough gas flows into the input gas opening 310 to continue to create enough primary pressure in the primary gas reservoir 305 so that the primary pressure times the piston area is greater than force from the more compressed spring 336B, the gas valve 300 will tend to remain open.

The gas valve 300 may be closed in two ways. If the gas entering the gas valve 300 through the primary gas input 310 is reduced or shut off, the primary pressure in primary gas reservoir 305 is reduced and the force from the spring 335B (which is compressed when the valve is open) will tend to push the piston against the primary gas outlet 324, closing the gas valve 300. The closure of the gas valve 300 due to pressure of spring 335B when the pressure within primary gas reservoir 305 falls to a sufficiently low level can occur independent of the position of the release valve 350—that is, with the release valve 350 open or closed, depending upon the pressure in reservoir 305.

The second manner of the release valve 350 being closed involves gas being provided to pressurize the control reservoir 335B to a point that the control pressure provides enough closing force on the piston 332 to overcome the opening force from the primary pressure. This causes the piston 332 to slide shut and push against the primary gas outlet 324, closing the gas valve 300. These two forces—the force of spring 335B and the force due to the pressure in control reservoir 335B—may act together in closing the valve.

The gas valve 300 may be built with various dimensions in various embodiments designed for use in different applications. In one embodiment, the input fitting 312 and output fitting 322 may be designed to mate with 1.5 inch (in.) threaded pipes. The inside diameter of the cylindrical receptacle 330 may be in a range from 1.6 in. to over 2.25 in. with one embodiment using a cylinder with an inside diameter of about 1.8 in. for the receptacle. Based on the inventor's experiments, if the area of the inside of the receptacle 330 is at least 10% larger than the area of the primary gas outlet 324, the gas valve 300 operates well. Other embodiments may use a wide range of sizes for the primary gas outlet 324 and for the receptacle 330, for example, in some embodiments the receptacle 330 size may vary within the range of 0.25 inch to 12 inches, with correspondingly sized inputs, outputs and fittings. In yet other embodiments the size of the body 301 can be any size as long as enough space is left between the receptacle 330 and the body 301 for the free flow of gas but in one embodiment, the body 301 is a cylinder about 4 in. in diameter. The conduit 341 may be of various sizes but some embodiments may use a ⅛ in. and others may use ¼ in. pipe and fittings. Other embodiments may use larger pipes or tubes with various fittings.

Some applications of the gas valve 300 are for use with compressed air at up to about 150 pounds per square inch (psi). So some embodiments may be designed for use at up to 150 psi of pressure in the primary gas reservoir 305. Other embodiments may be designed for use at lower pressures, such as under 100 psi or under 50 psi. Some embodiments may be designed for use with gas at low temperatures, such as under 100 degrees Celsius (C). Other embodiments may be designed for use at much lower or much higher temperatures. The intended operating temperature may impact the choice of materials and construction techniques used.

Figure 5A:
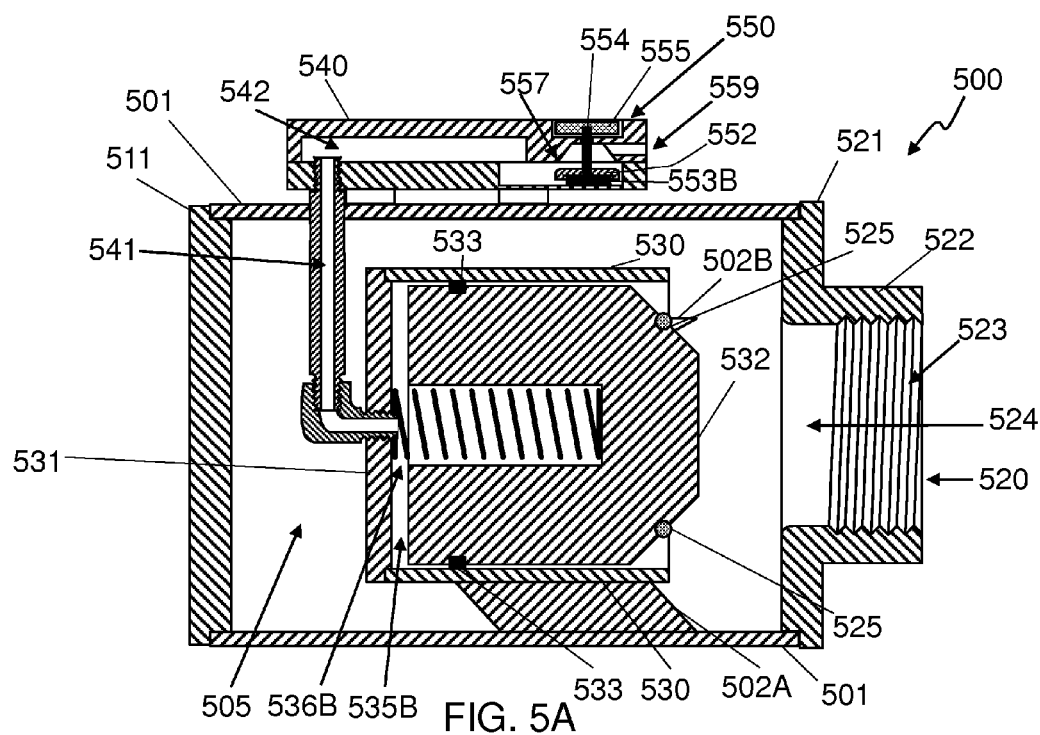
FIG. 5A shows a cross-sectional side view and FIG. 5B shows a cross-sectional front view of an alternate embodiment of a gas valve in an open position.
Figure 5B:
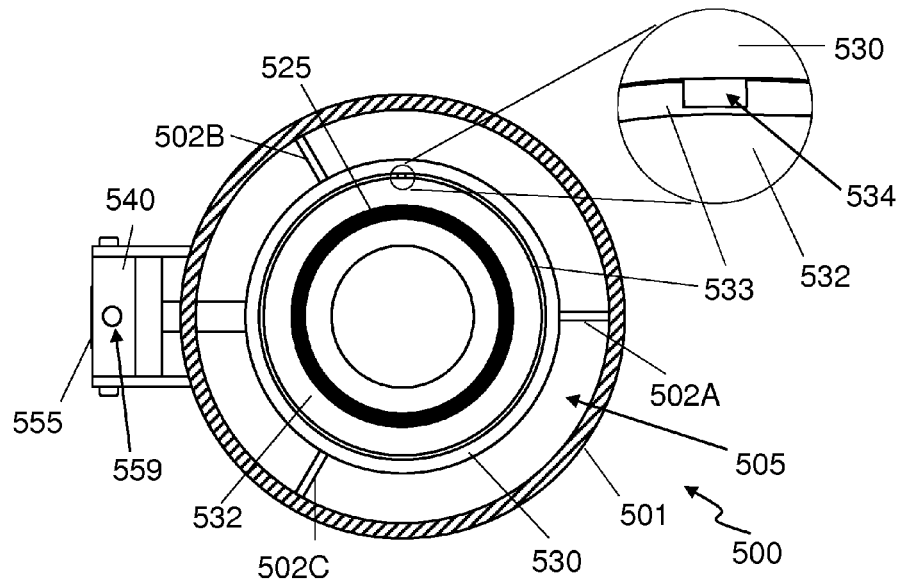

FIG. 5A shows a cross-sectional side view, and FIG. 5B shows a cross-sectional front view of an alternate embodiment of a gas valve 500 in an open position. The embodiment shown in FIGS. 5A and 5B is quite similar to the gas valve 300 discussed above and may use similar materials and constructions techniques although the gas valve 500 is shown enclosed in a pressure vessel (not to scale) with no input shown for filling the primary gas reservoir 505. One skilled in the art may easily understand the various means that may be provided to fill the primary gas reservoir 505 including the means shown in FIG. 1A or FIG. 4A. The gas valve 500 may have a cylindrical body 501 with two end-caps 511, 521 attached to the body 501 to form a primary gas reservoir 505. The output end cap 521 may have a primary gas outlet opening 520 formed by an output fitting 522 with threads 523. An output pipe may be connected to the output fitting 522 using the threads 523 or other types of connection.

A piston 532 may be shaped to fit into a cylinder 530 with a closed end 531 and slide in a reciprocating motion in the cylinder 530. The cylinder 530 may be positioned by supports 502A, 502B, 502C to allow the piston 532 to slide into position to seal the primary gas outlet 524. A compressed spring 536B may be positioned between the closed end of the cylinder 531 and the piston 532 to provide force to help keep the piston 532 seated against the primary gas outlet 524. A gasket or O-ring 525 may be positioned on the piston 532 to better seal against the primary gas outlet 524 if the gas valve 500 is closed.

The piston 532 may include one or more piston rings 533 that may be fitted around the piston 532 or may be an integral part of the piston 532 and may be interposed between the piston 532 and the cylinder 530. The piston ring 533 of the embodiment shown may have one or more notches 534 configured to allow for a controlled flow of gas between the primary gas reservoir 505 and the control reservoir 535B that may be created in the cylinder 530 between the closed end 531 of the cylinder 530 and the piston 532. Other embodiments may use a piston ring 533 that has been cut and is sized such that if it is positioned on the piston 532, a gap is left between the two ends of the cut piston ring 533.

A control block 540 may be attached to the body 501. A conduit 541 may pneumatically couple the control reservoir 535B and a plenum 542 in the control block 540, allowing gas to flow between the control reservoir 535B and the plenum 542. A release valve 550 may be positioned in the control block 540 to have an input pneumatically coupled to the control reservoir 535B via the plenum 542 and the conduit 541. The output of the release valve 550 may be pneumatically coupled to the exhaust port 559. The release valve 550 may include a valve body 552 configured to mate with valve seat 557 to form a gas-tight seal. A rod 554 may connect the valve body 552 to the release button 555. If primary pressure is maintained by having gas flow into the primary gas reservoir 505 from the gas input opening 510, then as long as the release button 555 is pressed, gas is free to flow from the control reservoir 535B out of the exhaust port 559, keeping the control reservoir 535B at a low pressure so that the gas valve 500 remains open.

If pressure holding the release button 555 down is removed, spring 553B may provide force to push the valve body 552 against the valve seat 557 and blocking the flow of gas out of the exhaust port 559. If this occurs, gas may flow from the primary gas reservoir 505, though the one or more gaps 534 in the piston ring 533 and eventually pressuring the control reservoir 535B to a control pressure approaching the primary pressure. As this occurs, the closing force on the piston 532 may eventually exceed the opening force due to the force from the compressed spring 536B, and the piston 532 may slide against the primary gas outlet 524, closing the gas valve 500.

By using one or more small gaps 534 in the piston ring 533, gas may flow from the primary gas reservoir 505 to fill the control reservoir 535B. But the small size of the gaps 534 may not allow the gas to flow fast enough to equalize the pressure between the primary gas reservoir 505 and the control reservoir 535B. The pressure differential created allows the closing force and opening forces on the piston 532 to work as described above.

In the embodiment shown, some gas may flow from the primary gas reservoir 505, through the gap 534, the control reservoir 535B, the conduit 541, the plenum 542, the release valve 550 and out the exhaust port 559 while the release valve 550 is held open. This may be fine for some applications while other applications may not tolerate that type of gas leakage.

The size and number of gap 534 required may depend on several factors including, for example, the rate of increase of the pressure in the primary gas reservoir 505, the maximum volume of the control reservoir 535 and the fit of the piston 532 in the cylinder. It is expected that for some of the applications envisioned by the inventor, such as the use in a tire seating device, one gap 534 about 0.25 inch wide and about 0.05 inches deep should allow the gas valve 500 to operate properly. Other applications may utilize a different number and/or size of gap 534 in the piston ring 533.

In another embodiment of gas valve 500, the input fitting 512 and threads 513 may be designed to mate with a standard carbon-dioxide ($CO_2$) tank with a CGA320 fitting that may contain $CO_2$ at 800 psi or more. In the embodiment using $CO_2$, the primary gas outlet 524 may have a diameter of 0.47 in. and the cylinder 530 may have an inside diameter of 0.61 in with the body 501 having a 2 in. diameter and a 0.095 wall thickness. Other embodiments may use different dimensions depending on the gas and pressure used as well as the specifics of the application. Some embodiments may be designed for use with nitrogen, helium, air or other gases at pressures ranging from a few psi to several thousand psi.

Figure 6:
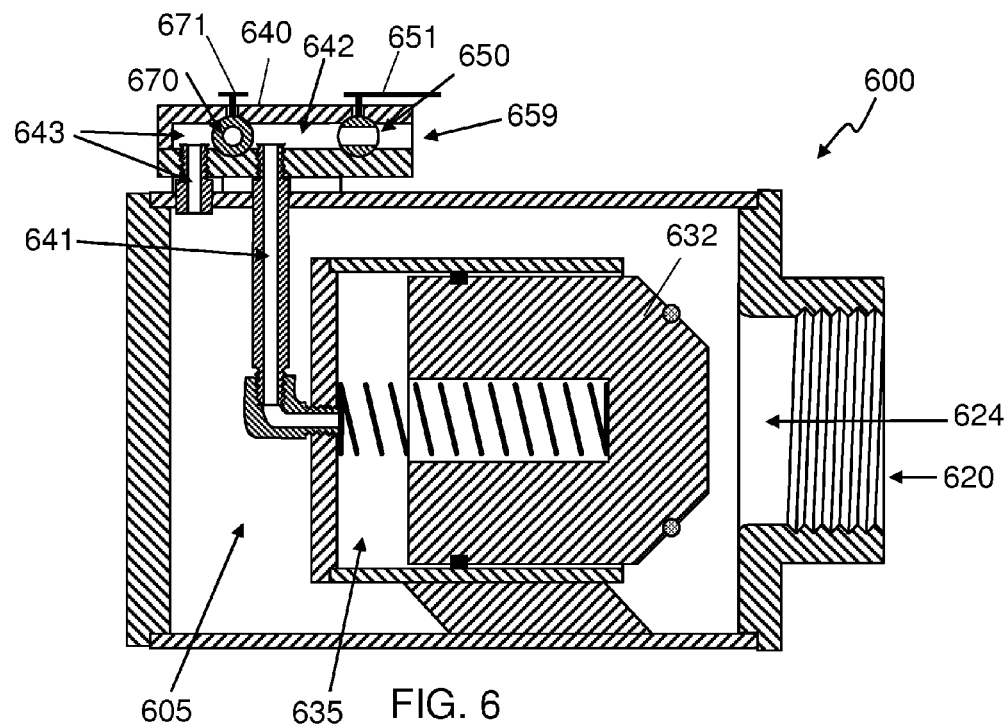
FIG. 6 shows a cross-sectional side view of another alternate embodiment of a gas valve in a partially open position.

FIG. 6 shows a cross-sectional side view of another alternate embodiment of a gas valve 600 in a partially open position. Due to the similarities of this embodiment with the previously described embodiments, some of the details of the construction for this embodiment are not discussed here. The primary gas reservoir 605 may not be shown to scale and no input is shown for filling the primary gas reservoir 605. One skilled in the art may easily understand the various means that may be provided to fill the primary gas reservoir 605 including the means shown in FIG. 1A or FIG. 4A. The gas valve 600 includes a gas output opening 620 with a primary gas outlet 624. A piston 632 may be positioned to slide into position to seat against the primary gas outlet 624, closing the gas valve 600 and blocking the flow of gas from the primary gas reservoir 605 through the gas output opening 620.

A control block 640 may have a primary gas tap 643 allowing gas from the primary gas reservoir 605 to flow into the control block 640. A fill valve 670, which a ball valve in this embodiment but could be any type of suitable valve in other embodiments, may be controlled by a fill handle 671. If the fill valve 670 is open, gas may flow from the primary gas reservoir 605, through the primary gas tap 643 into the plenum 642 which is pneumatically coupled to the control reservoir 635 and to the input of the release valve 650. The release valve 650 is ball valve in this embodiment but could be any type of suitable valve in other embodiments. The release valve 650 may be controlled using the release handle 651 and if the release valve 650 is open, gas may flow from the plenum 642 out of the exhaust port 659.

To close the gas valve 600, the release valve 650 may be closed and the fill valve 670 may be opened, allowing gas to flow from the primary gas reservoir 605, through the primary gas tap 643, through the fill valve 670, the plenum 642 and the conduit 641 into the control reservoir 635. As the pressure in the control reservoir 635 increases and begins to approach the pressure in the primary gas reservoir 605, the force of the spring 636 pushes the piston 632 to seat against the primary gas outlet 624 closing the gas valve 600.

To open the gas valve 600, the fill valve 670 may be closed and the release valve 650 opened allowing gas to flow from the control reservoir 635, though the conduit 641, the plenum 642 the release valve 650 and out the exhaust port 659. As the pressure in the control reservoir 635 begins to drop toward the pressure of the surrounding atmosphere, the opening force on the piston 632 due to the pressure of the primary gas reservoir 605 acting on the area of the piston 632 exposed to the primary gas reservoir 605, may overcome the closing force on the piston 632 due to force of the spring 636 and the pressure of the control reservoir 635 acting on the entire area of the piston 632 exposed to the control reservoir 635, thereby opening the gas valve 600. FIG. 6 shows the gas valve 600 in the process of opening soon after the release valve 650 is opened.

Figure 7:
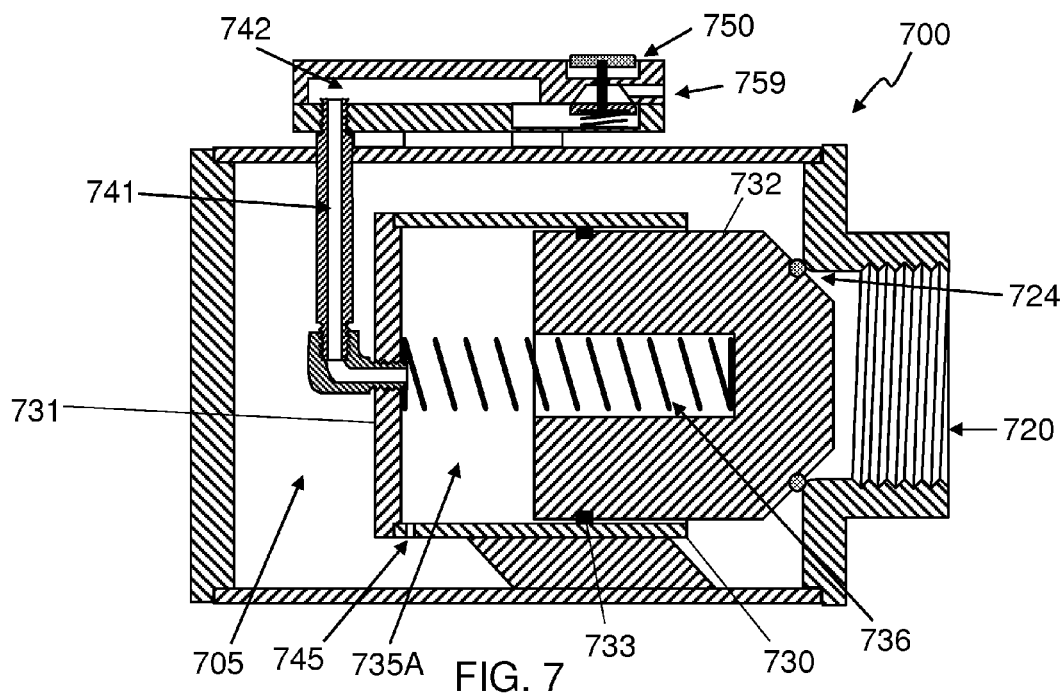
FIG. 7 shows a cross-sectional side view of yet another alternate embodiment of a gas valve in a closed position.

FIG. 7 shows a cross-sectional side view of yet another alternate embodiment of a gas valve 700 in a closed position. Due to the similarities of this embodiment with the previously described embodiments, some of the details of the construction for this embodiment are not discussed here. The primary gas reservoir 705 may not be shown to scale and no input is shown for filling the primary gas reservoir 705. One skilled in the art may easily understand the various means that may be provided to fill the primary gas reservoir 705 including the means shown in FIG. 1A or FIG. 4A. The gas valve 700 includes a gas output opening 720 with a primary gas outlet 724. A cylinder 730 with a closed end 731 may be positioned so that a piston 732 sliding in the cylinder 730 may slide against the primary gas outlet 724, closing the gas valve 700 and blocking the flow of gas from the primary gas reservoir 705 through the gas output 720.

A control reservoir 735A may be pneumatically coupled to the input of a release valve 750 by a conduit 741 and a plenum 742. If the release valve 750 is closed, gas from the primary gas reservoir 705 may enter the control reservoir 735A through one or more small holes 745 in the cylinder 730 which may include the closed end 731 of the cylinder 730. In other embodiments gas from the primary gas reservoir 705 may enter the control reservoir 735A through one or more small holes in the piston 732. As the pressure in the control reservoir 735A increases and begins to approach the pressure in the primary gas reservoir 705, the force of the spring 736 pushes the piston 732 to seat against the primary gas outlet 724 closing the gas valve 700. If the release valve 750 is opened, gas from the control reservoir 735A may be released through the exhaust port 759. As the pressure in the control reservoir 735A begins to drop toward the pressure of the surrounding atmosphere, the opening force on the piston 732 may overcome the closing force on the piston 732 opening the gas valve 700.

The size and number of the holes 745 in the cylinder 730 may depend on several factors, including expected rate of pressure increase in the primary gas reservoir 705 and the maximum size of the control reservoir. For the application envisioned by the inventor, where the gas output opening 724 is about 1.5 inches in diameter, a hole 745 as small as $\frac{1}{32}$ inch in diameter has shown to be adequate for proper operation of the gas valve 700. Other applications may utilize a different number and/or size of hole 745.

Figure 8:
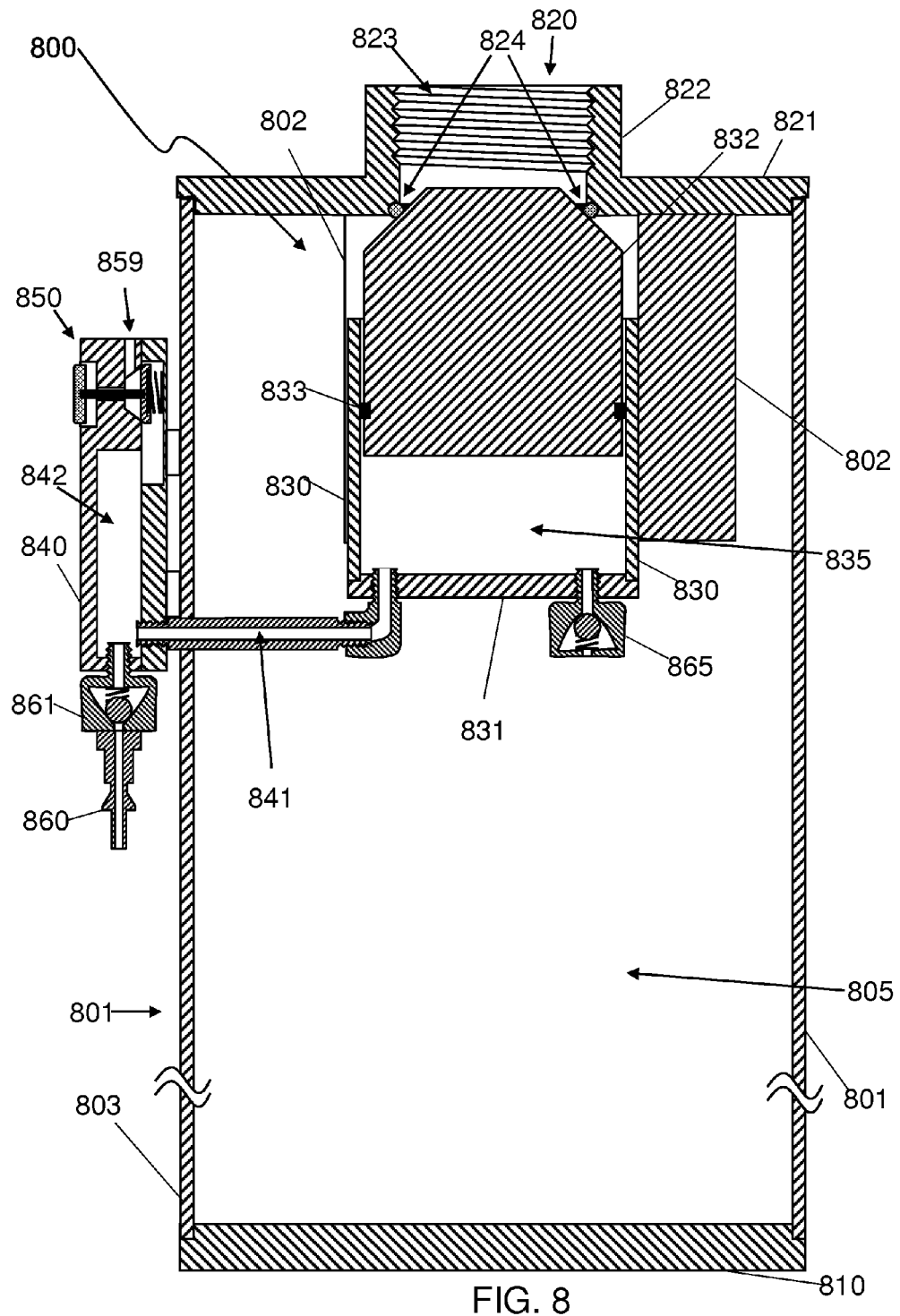
FIG. 8 shows a cross-sectional side view of an embodiment of a gas valve directly positioned in a pressure vessel.

FIG. 8 shows a cross-sectional side view of an alternate embodiment of a gas valve 800 directly positioned in a pressure vessel or tank 801. The tank 801 may be made from a body 803 that may be cylindrical or some other shape, an end cap 810 and an output end cap 821. The output end cap 821 may have an output fitting 822 with threads 823 to provide a primary gas output opening 820. A cylinder 830 with a closed end 831 may be positioned inside the tank 801 using supports 802 that connect the cylinder 830 to the output end cap 821. Any number of supports 802 may be used. The cylinder 830 may be positioned to allow a piston 832 that may slide in a reciprocating motion in the cylinder 830 to push against the primary gas outlet 824 to close the gas valve 800. The piston 832 may include one or more piston rings 833 to provide for a better seal between the piston 832 and the cylinder 830 without increasing the friction too much.

A control body 840 may be mounted on the outside of the tank 801. The control body may have an quick-connect gas fitting 860 with check valve 861 to allow gas to flow from an external gas source that may be connected to the quick-connect gas fitting 860 into the plenum 842 but not allow the gas to escape from the plenum 860 back out through the quick-connect gas fitting 860. The plenum 842 is pneumatically coupled to the input of a release valve 850. The plenum 842 is also pneumatically coupled to a control reservoir 835 formed in the cylinder 830 between the piston 832 and the closed end 831 of the cylinder 830 through a conduit 841. A check valve 865 may allow gas to flow from the control reservoir 835 into the primary gas reservoir 805 but not allow gas to flow in the other direction. The quick-connect gas fitting 860 and check valve 861 along with check valve 865 could take the place of the input port 160 and input valve 161 if a similar configuration of the gas valve 800 were to be used in a tire seating device similar to the tire seating device 190 as shown in FIG. 1A.

If an external gas source is connected to the quick-connect gas fitting 860 while the release valve 850 is closed, the gas will flow through the plenum 842 and conduit 841 into the control reservoir 835, pressurizing the control reservoir 835 and seating the piston 832 against the primary gas outlet 824 to close the gas valve 800 and sealing the tank 801. As soon as the gas in the control reservoir 835 has enough pressure to open the check valve 865, gas flows from the control reservoir 835 into the primary gas reservoir 805 and begins to pressurize the tank 801. The control reservoir 835 may maintain a higher pressure than the primary gas reservoir 805 by at least the activation pressure of the check-valve 865 which may keep the piston 832 seated against the primary gas outlet 824 even if no spring is included although some embodiments may include a spring between the closed end 831 of the cylinder 830 and the piston 832.

After the primary gas reservoir 805 is at the desired primary pressure and the control reservoir 835 is at a control pressure, the external gas source may be disconnected from the quick-connect gas fitting 860. If the release valve 850 is opened, gas may flow from the control reservoir 835, through the conduit 841, the plenum 842, the release valve 850 and out the exhaust port 859 causing the control pressure to drop. After the control pressure drops below the release pressure, the opening force on the piston 832 may exceed the closing force causing the piston 832 to quickly slide into the cylinder 830 away from the primary gas outlet 824, opening the gas valve 800, and allowing the gas in the primary gas reservoir 805 to exit through the primary gas output opening 820.

Figure 9A:
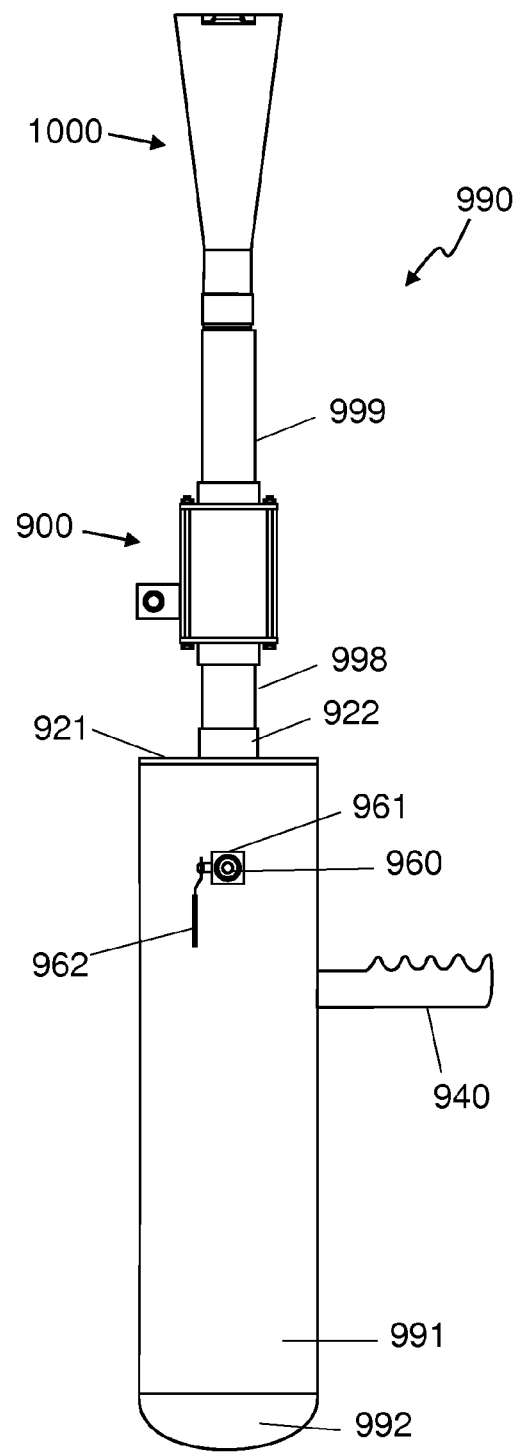
FIG. 9A shows an alternative embodiment of a tire seating device.

FIG. 9A shows an alternative embodiment of a tire seating device 990. The tire seating device 990 may include a pressure vessel or tank 991 with a rounded end 992 and an end cap 921 with an output fitting 922. The tank 991 may be of any size and/or shape and in some embodiments may be cylindrical while in other embodiments may be spherical or some other shape. The embodiment shown has the output fitting 921 emerging axially from the tank 991 but other embodiments may have the output fitting at other places on the tank 991. A tank 991 may be very similar to tank 191 shown in FIG. 1A-D or may be of some other design. A grip 940 may be attached to the tank 991 to allow for easy handling of the tire seating device 990.

Input port 960 may allow for an external pressurized gas source to be connected to the tank 991 to fill the tank 991. Input valve 961 which may be controlled by valve handle 962 may be opened to allow the tank 991 to be filled and then closed to allow the pressurized gas in the tank 991 to remain if the external gas source is disconnected.

A first tube 998 may pneumatically couple the tank 991 to an input of gas valve 900. The gas valve 900 may be any of the embodiments described herein but the embodiment shown in FIG. 9A is described below. A second tube 999 may pneumatically couple the gas valve 900 to a nozzle 1000. The nozzle 1000 may be any type of nozzle suitable for blowing air between a rim and a tire including any of the embodiments described herein. The embodiment shown in FIG. 9A is a conventional nozzle which will be described in more detail below.

Figure 9B:
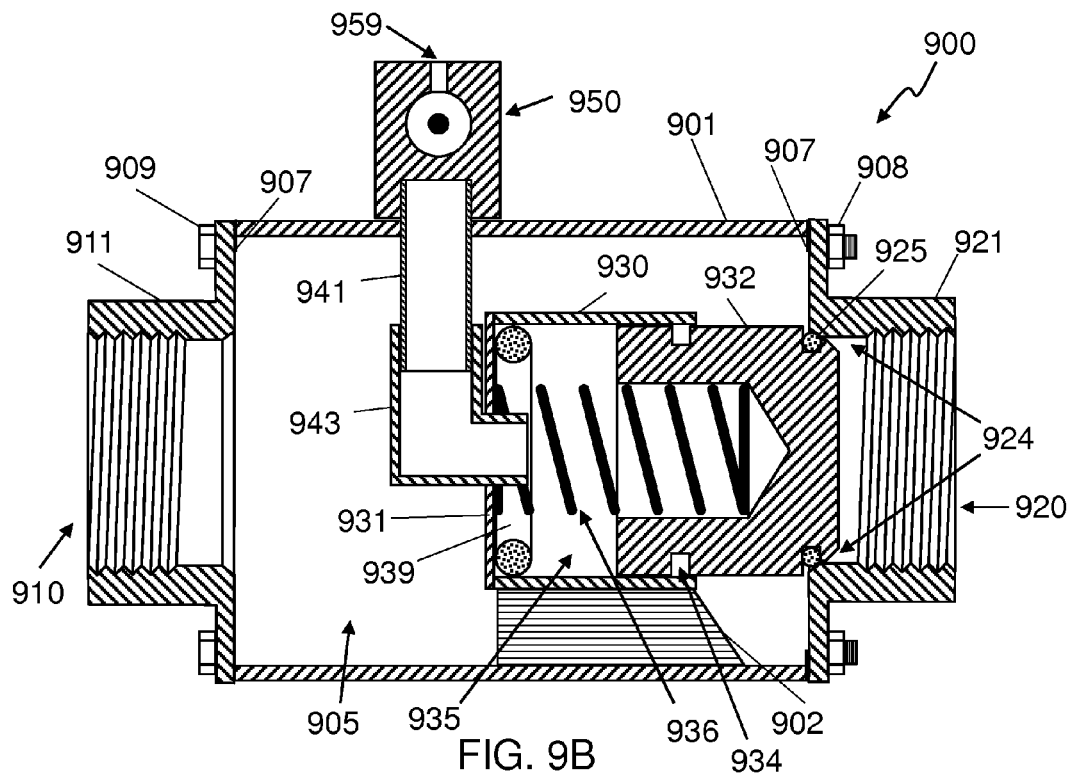
FIG. 9B shows a cross-sectional side view and FIG. 9C shows a cross-sectional front view of a different embodiment of a gas valve that may be used in the tire seating device of FIG. 9A.
Figure 9C:
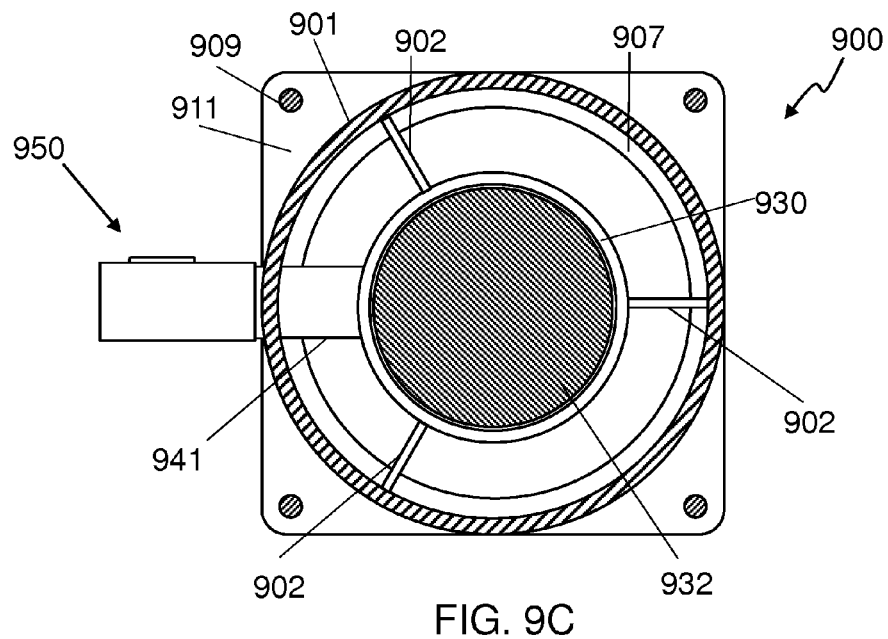
Figure 9D:
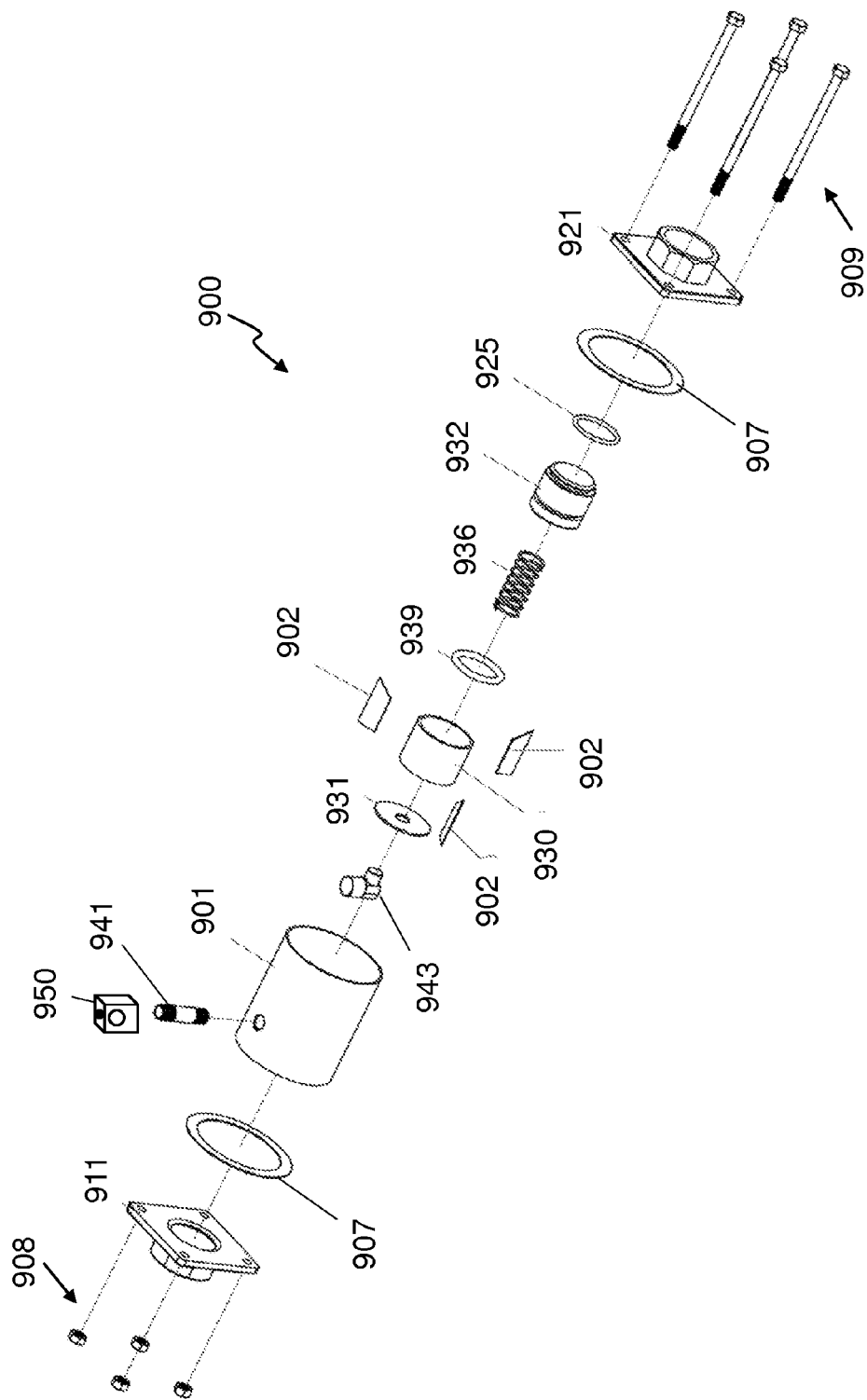
FIG. 9D shows an exploded assembly view of the different embodiment of the gas valve of FIG. 9B.

FIG. 9B shows a cross-sectional side view and FIG. 9C shows a cross-sectional front view of a different alternate embodiment of a gas valve 900 in a closed position and FIG. 9D shows an exploded assembly drawing of the gas valve 900. Gas valve 900 may operate in a very similar way to gas valve 200 of FIG. 2A-B so many details of the construction and operation of gas valve 900 may be omitted for simplicity. The gas valve 900 may be made up of a body 901 with an input end cap 911 with gas input 910 and an output end cap 921 with gas outlet 920. The two end-caps 911, 921 may be clamped onto the body 901 using four bolts 909 with nuts 908 and gaskets 907 between each end cap 911, 921 and the body 901 to help provide a gas-tight seal.

A cylinder 930 with a closed end 931 may be positioned in the body using three supports 902. The cylinder 930 may be positioned to allow a piston 932 to slide partially out of the cylinder 930 and press against the primary gas outlet 924 with the O-ring 925, to close the gas valve 900. A groove 934 in the piston 932 may be included. The groove 934 may be used to position a piston ring in some embodiments. A spring 936 positioned between the closed end 931 of the cylinder 930 to provide a closing force on the piston 932 and a large O-ring 939 may be included at the back of the cylinder 930 to provide a cushion for the piston 932 as the piston 932 slides back into the cylinder 930 quickly. A control reservoir 935 may be formed in the cylinder between the piston 932 and the closed end 931 of the cylinder 930. The control reservoir 935 may be pneumatically coupled to the input of a release valve 950 by an elbow joint 943 and conduit 941.

If the release valve 950 is closed, gas may enter the control reservoir 935 between the piston 932 and the cylinder 930 to pressurize the control reservoir 935. If the release valve 950 is opened, gas from the control reservoir 935 may exit through the exhaust reservoir 959 to reduce the pressure in the control reservoir 935 to open the gas valve 900. The opening force on the piston 932 may not be as large as some of the other embodiments shown, but as discussed earlier, the difference between the diameter of the cylinder 930 and the diameter of the primary gas outlet 924 does not need to be large for operation of the gas valve 900. The small gap between the piston and the flat end of the output end cap 921 is enough to allow the pressure of the primary gas reservoir 905 to act on the annular ring of the exposed piston 932 to open the gas valve 900.

Figure 10A:
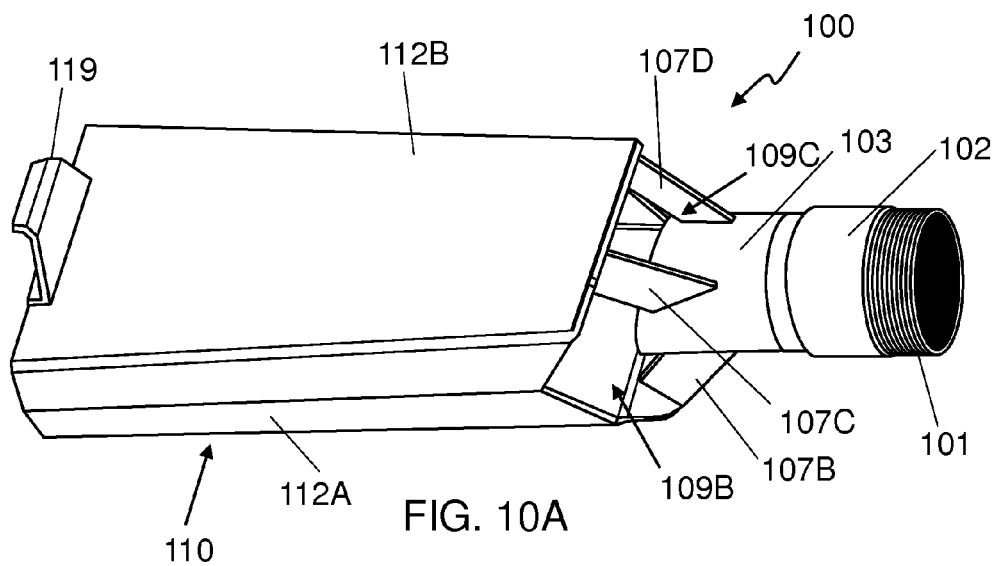
FIGS. 10A and 10B show isometric views of an embodiment of a tire seating nozzle.
Figure 10B:
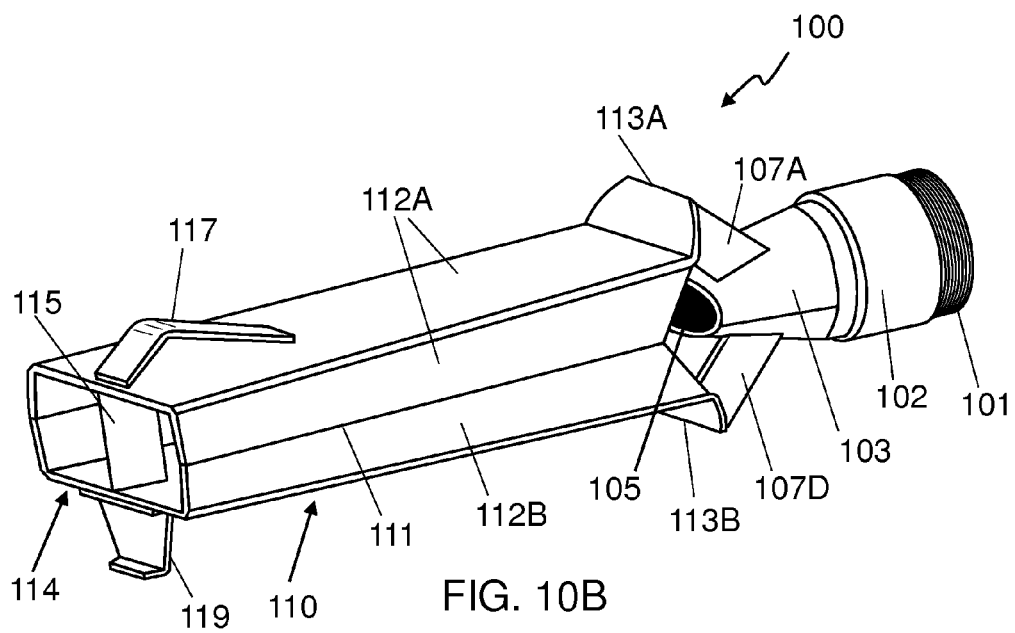

FIGS. 10A and 10B show isometric views of an embodiment of a tire seating nozzle 100 as shown the embodiment of the tire seating device 190 of FIG. 1A-D. The tire seating nozzle 100 may be built in various ways and of various materials. The nozzle 100 may be built from several pieces and assembled into a rigid unit. The various pieces may be constructed from sheet metal such as steel, aluminum or other metal or may be molded or fabricated from engineering plastics or cast from metal. Any construction method may be used that is suitable for the application.

Most of the various pieces described below for the embodiment shown for nozzle 100 may be fabricated from 1.5 millimeter (mm) thick sheet steel although the coupling 102 with threads 101 that may be purchased as a finished part or constructed using techniques suitable for making high pressure couplings such as casting or extruding followed by a machining process to fabricate the screw threads. Other similar embodiments may use thicker or thinner steel or a different metal depending on the application and desired size of the nozzle 100.

The various pieces of the nozzle 100 may be assembled and attached to one another using any suitable technique including, but not limited to welding, brazing, soldering, gluing, or other attachment method. The assembled nozzle 100 may be painted, plated, powder-coated, or otherwise treated to help the nozzle 100 resist corrosion and/or provide for a pleasing appearance.

Figure 11A:
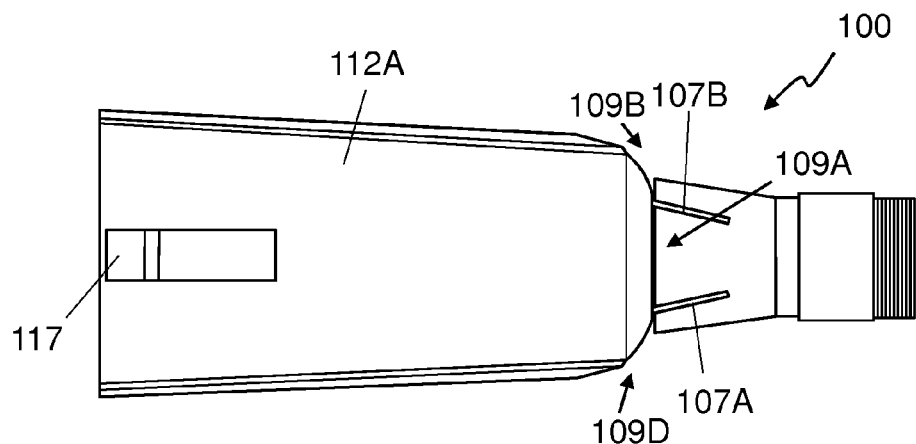
Figure 11B:
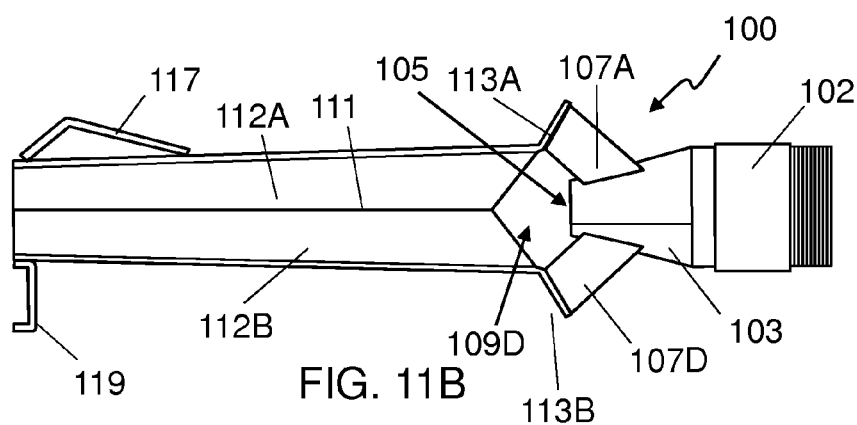
Figure 11C:
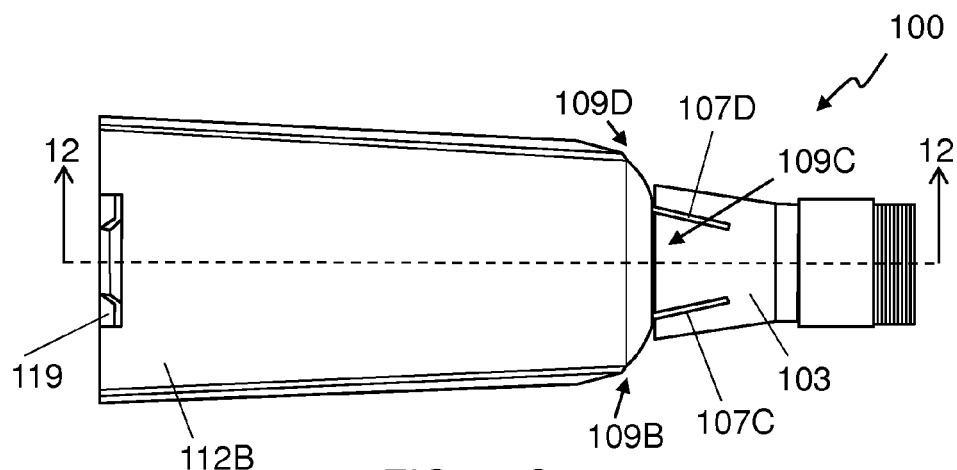

FIG. 10A shows an isometric view of the nozzle 100 from a position behind and above the nozzle 100. FIG. 10B shows an isometric view of the nozzle 100 from a position in front of and below the nozzle 100. FIG. 11A shows a bottom view of the nozzle 100. FIG. 11B shows a side view of the nozzle 100. FIG. 11C shows a top view of the nozzle 100 and also shows a position of the cross-sectional view shown in FIG.

12. FIG. 11D shows a front view of the nozzle 100. FIG. 11E shows a rear view of the nozzle 100. FIG. 12 shows a cross sectional view of the nozzle 100 at the position 12-12 of FIG. 11C. The following discussion may be applied to any of FIGS. 10A-B, 11A-E and/or FIG. 12. Not every part is identified in every view even if it is visible, but enough parts are labeled in the various views to allow one skilled in the art to clearly identify the various parts and how the various parts may connect and/or interact.

The nozzle 100 may include a coupling 102 with threads 101 that may be used to connect the nozzle 100 to a source of pressurized gas. Other embodiments may use other types of connections to a source of pressurized gas including, but not limited to a quick-release coupling, a bayonet type coupling, welding to a pipe or tube, gluing to a pipe or tube, a compression fitting, or other attachment means. The coupling 102 may be attached to an input aperture of a jet nozzle or jet 103 creating an air-tight seal between the coupling 102 and the jet 103 in most embodiments although some leakage may be acceptable. An orifice 105 is located at the opposite end of the jet 103 from the input aperture. The jet 103 and orifice 105 are configured to emit a stream of gas if pressurized gas is introduced into the coupler 102. In many embodiments, the orifice 105 may be smaller than the input aperture of the jet 103 to provide a higher velocity stream of gas than the velocity of the pressurized gas entering the coupler 102 and input aperture of the jet 103. In various embodiments, the threads 101, the coupling 102 and the jet 103 may either be separate parts connected together to form an air tight seal, or may be one solid part, e.g., cast and machined from metal or other material.

A nozzle body 110 may be fabricated from two halves, the nozzle body bottom half 112A and the nozzle body top half 112B. The two halves 112A, 112B may be alike and built to the same specifications. The two halves 112A, 112B may be joined together at seam 111 to create a chamber 108 between the two halves 112A, 112B. At one end of the nozzle body 110, a nozzle outlet 114 may be created and at the other end of the nozzle body 110, the nozzle body bottom half 112A has bottom attachment lip 113A and the nozzle body top half 112B has a top attachment lip 113B. In some embodiments, a nozzle brace 115 may be included at the outlet 114 to help provide strength to the outlet 114 and keep the outlet 114 from being bent as it is used. In some embodiments the nozzle body 110 may be formed from one solid piece, either with one seam or with no seams, rather than being assembled from the two halves 112A and 112B.

The nozzle body 110 may be attached to the jet 103 using four attachment braces 107A-D and situated so that the stream of gas emitted from the jet 103 enters the chamber 108. This may be seen in the cross-section depicted in FIG. 12. Two attachment braces 107A, 107B may connect the bottom attachment lip 113A to the jet 103 and the other two attachment braces 107C, 107D may connect the top attachment lip 113B to the jet 103. The orifice 105 may be located at a location near the plane passing through the outer edges of the bottom and top attachment lips 113A, 113B and may be, in some embodiments, oriented substantially in-line with, meaning no more than a 45 degree angle with, the longitudinal axis of the nozzle body 110. The orifice 103 may be shaped to somewhat match the shape of the chamber 108 where the gas stream from the orifice 105 enters the chamber. In the embodiment shown, the chamber 108 has a flattened cross section that is wider than it is tall and the orifice 103 has an oval shape with the major axis of the oval lining up with the width of the chamber 108. The cross-sectional area of the chamber 108 measured perpendicular to the longitudinal axis of the nozzle body near where the stream of gas enters the chamber 108 may be larger than the orifice 105 and may be typically be 2-10 times larger to provide space for the air intake ports 109A-D. In some embodiments the cross-sectional area of the chamber 108 may be greater than 10 times larger than that of the orifice 105, for example, for embodiments using a higher pressure gas supply and/or using gases of greater density than air.

The air intake ports 109A-D are the openings defined by the bottom and top nozzle halves 112A, 112B, the attachment braces 107A-D and the jet 103. Air intake port 109A is located between attachment brace 107A and attachment brace 107B, air intake port 109B is located between attachment brace 107B and 107C, air intake port 109C is located between attachment brace 107C and attachment brace 107D, and air intake port 109D is located between attachment brace 107D and 107A. The combined area of the air intake ports 109A-D may be at least as large as the orifice 105 and may typically be 4-20 times larger. As mentioned above, some embodiments may feature a cross-sectional area of the chamber 108 that is greater than 20 times larger than that of the orifice 105, for example, for embodiments using a higher pressure gas supply and/or using gases of greater density than air.

The outlet 114 may typically be somewhat smaller than the maximum cross-sectional area of the chamber 108 although in some embodiments, the chamber 108 may have a constant cross-sectional area from the orifice 105 to the outlet 114, or the outlet 114 may be somewhat larger than the cross-sectional area of the chamber 108. In many embodiments, the chamber 108 may flatten as it nears the outlet 114 to provide a more suitable shape for the nozzle to be positioned between the tire and the rim. In some embodiments, the outlet 114 may have an area that is between 50% and 100% of the maximum cross-sectional area of the chamber 108, which in many embodiments may be near where the stream of gas from the orifice 105 enters the chamber 108.

A rim bracket 119 may be attached to the nozzle body top half 112B near the outlet 114 that may be useful in positioning the nozzle 100 properly between the rim and the tire. A tire bumper 117 may be attached to the nozzle body bottom half 112A to help push the tire away from the rim to provide space for air to enter into the tire. Some embodiments may not have the tire bumper 117.

Various embodiments of the nozzle 100 may be built with different sizes and geometries depending on the targeted tire sizes and gas pressures being supported. For example, one embodiment targets tires sizes typical of commercial truck tires. This embodiment may have the following approximate dimensions:

Inside Diameter of the Coupler 102—42 mm
Width of Orifice 103—54 mm
Height of Orifice 103—18 mm
Width of Chamber 108 near Orifice 103—89 mm
Height of Chamber 108 near Orifice 103—43 mm
Length of Nozzle Body 110—200 mm
Width of Nozzle Outlet 114—106 mm
Height of Nozzle Outlet 114—35 mm
Overall Length of Nozzle 100—310 mm
Overall Width of Nozzle 100—106 mm
Overall Height of Nozzle 100—88 mm Some embodiments may provide multiple nozzle outlets 114 directed between a tire and a rim, or in some implementations, multiple nozzles 100 which are each directed to provide a burst of air between a tire and a rim. For example, in one embodiment a tire machine—that is, a machine for mounting a tire on a rim—is fitted with multiple nozzles 100, each of which is configured to blow a burst of air in between a tire and a rim in order to seat the tire on the rim. In such embodiments, the multiple nozzles 100 may be configured as part of the clamps holding the wheel, adjacent the clamps, or in between the clamps holding the wheel in place while the tire is mounted.

FIG. 13 shows gas and air flowing through a cross-sectional view of the tire seating nozzle 100. Pressurized gas 182 may enter the coupler 102 from a source of pressurized gas such as the cylindrical pressure vessel 191 of the tire seating device 190. As the pressurized gas 182 and flows through the jet 103, the cross-sectional area of the jet may narrow and the speed of the gas flowing through the jet 103 may increase due to the law of conservation of matter. As the gas exits the orifice 105, it creates a first stream of gas 185. The stream of gas 185 is flowing much faster than the air surrounding the nozzle 100 creating a lower pressure than the outside air due to Bernoulli's principle. This creates a pressure differential between the chamber 108 and the outside air causing air to enter through the air intake ports 109A-109D with air flow 189A entering through air intake port 109A and air flow 189C entering through air intake port 109C. Air may also enter through air intake port 109B and air intake port 109D but those air flows are not shown in FIG. 13. The effect of drawing air into a chamber through the air intake ports 109A-D as a stream of fluid 185 enters the chamber 108 may be known as the Venturi effect.

The stream of gas 185 coming from the orifice 105 may mix with the air flows 189A, 189C as they flow down the chamber 108 through the nozzle body 110. The mix of air and gas 184 may then flow out of the output 114 as a second stream of gas. The second stream of gas 184 includes the first stream of gas 185 and the air entering through the air intake ports 109A-109D. The total mass of the air and gas 184 may be larger than the mass of pressurized gas 182 that enters the coupling 102 due to air flows 189A, 189C that may add to the mass of the pressurized gas 182.

Figure 14A:
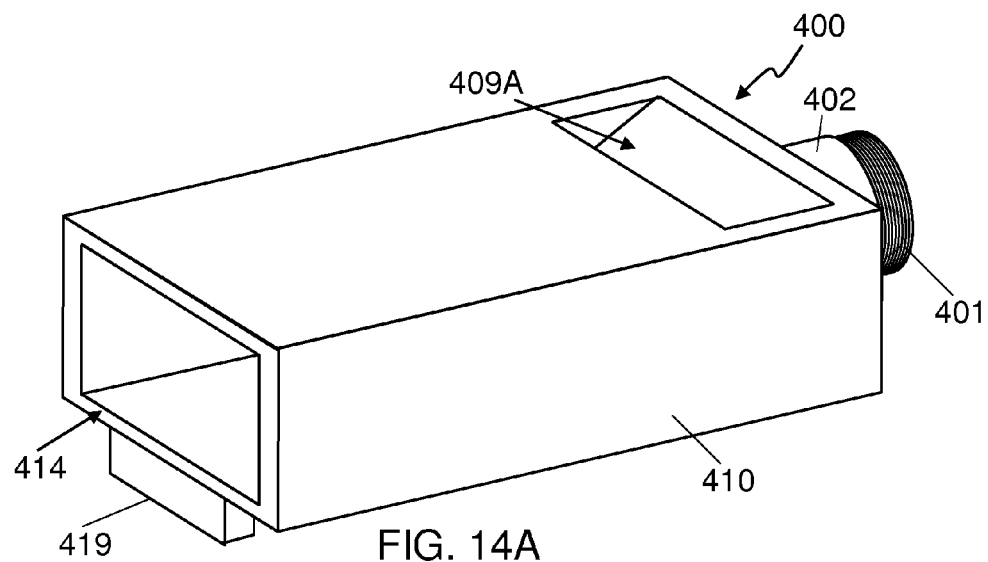
FIG. 14A-C show an alternative embodiment of a tire seating nozzle.
Figure 14B:
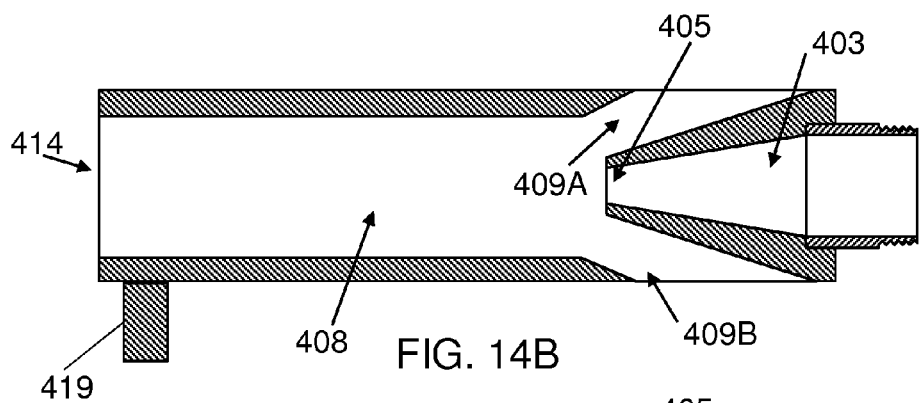
Figure 14C:
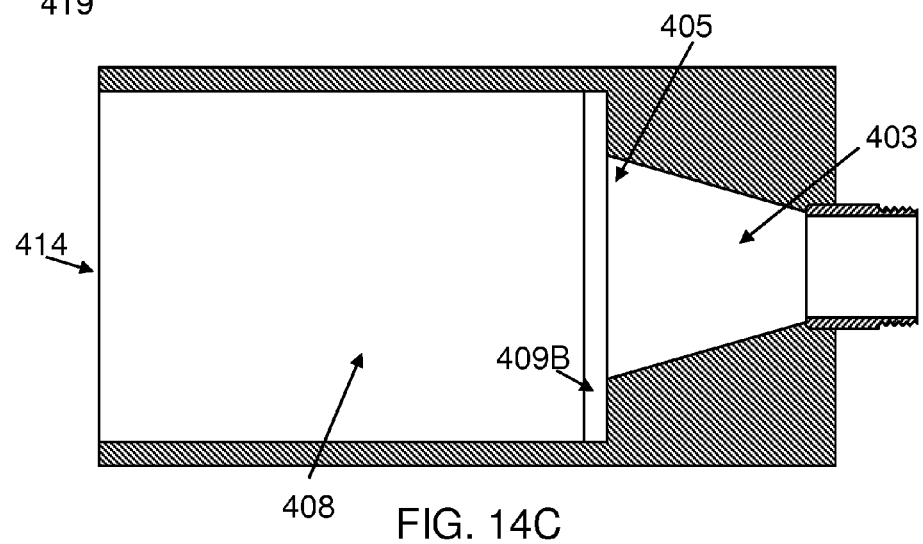

FIG. 14A shows an isometric view of an alternative embodiment of a tire seating nozzle 400. FIG. 14B shows a cross-sectional side view through the longitudinal axis of the nozzle 400 and FIG. 14C shows a cross-sectional top view through the longitudinal axis of the nozzle 400. Nozzle 400 may be molded from engineering plastic or cast from metal as a single piece or may be assembled from multiple pieces that may be molded, cast, or fabricated by some other method.

The coupling 402 may be an integrated part of the single piece nozzle 400 with the threads 401 created with a separate machining operation or molded directly in. Other embodiments may attach a separate coupling 402 to the nozzle body 410. The coupling 402 may direct pressurized gas to the jet 403 to emit a stream of gas through the orifice 405 into the chamber 408. Bottom air intake port 409A and top air intake port 409B allow air to enter the chamber from outside of the nozzle 400 and to be emitted, along with the stream of gas, through the output 414. Other embodiments may have additional air intake ports on the sides of the nozzle body 410. A rim bracket 419 may be attached to the top of the nozzle body 410 near the outlet 414.

FIG. 15A shows an isometric view of another alternative embodiment of a tire seating nozzle 450. FIG. 15B shows a cross-sectional side view through the longitudinal axis of the nozzle 450 and FIG. 15C shows a cross-sectional top view through the longitudinal axis of the nozzle 450. Nozzle 450 may be created using halves of the nozzle body 460 molded from an engineering plastic or cast from metal as two identical halves that may be welded, bolted, glued or otherwise attached, or may be molded, cast, or fabricated by some other method.

The coupling 452 with threads 451 may have a lip 454 extending outward radially at the end opposite from the threads 451. The two halves of the nozzle body 460 may capture the lip 454 of the coupling 452 to hold it securely in place as it is assembled so that the pressure created by the pressurized gas does not pop the coupling out of the nozzle body 460. The coupling 452 may direct pressurized gas to the jet 453 to emit a stream of gas through the orifice 455 into the chamber 458. Bottom air intake port 459A and top air intake port 459B allow air to enter the chamber 458 from outside of the nozzle 450. A rim bracket 469 may be attached to the top of the nozzle body 460 near the outlets 464A, 464B.

The outlet of this embodiment is divided into the left nozzle outlet 464A and the right nozzle outlet 464B. The two nozzle outlets 464A, 464B may emit air taken in through the air intake ports 459A, 459B, along with the stream of gas from the orifice 455. The air may be emitted from the two nozzle outlets 464A, 464B in a direction generally in line with the longitudinal axes 474A, 474B of the each nozzle outlet 464A, 464B. The left nozzle outlet 464A has a left nozzle longitudinal axis 474A that may form an angle with the right nozzle longitudinal axis 474B of the right output nozzle 464B. The overall longitudinal axis 470 of the nozzle 450 may go through the center of the coupling 452, the center of the orifice 455 and between the center of the two nozzle outlets 464A, 464B and be approximately in line with the direction of the stream of gas emitted from the orifice 455. The overall longitudinal axis 470 may approximately bisect the angle created between the left nozzle longitudinal axis 474A and the right nozzle longitudinal axis 474B. Approximately bisecting the angle may be interpreted as the overall longitudinal axis 470 being within 60 degrees of being in the same plane as the two nozzle longitudinal axes 474A, 474B, and the projection of the overall longitudinal axis 470 onto the plane of the nozzle longitudinal axes 474A, 474B being between the two nozzle longitudinal axes. The angle between the two nozzle longitudinal axes 474A, 474B may usually be less than about 120 degrees and in many embodiments may be between about 20 and about 60 degrees.

Other embodiments may separate the outlet into several outlet ports and others may provide an air plenum shaped to match the curvature of the rim with several outlet ports along the plenum to distribute the air blown into the tire over a wider area. Any configuration may be used for the outlet of the nozzle.

Various embodiments of tire seating nozzles utilizing the Venturi effect may have a wide variety of different configurations of air intake ports. There may be a wide variety of number of air intake ports, their shape, their total area, and their placement with respect to the orifice. Any variation that still creates a larger mass of gas and air being expelled from the outlet than the mass of gas that is provided at the coupling of the nozzle may be an acceptable embodiment. In the inventor's experience, one efficient orientation of the jet, orifice, chamber and air intake ports is that used for nozzle 100 as shown in the various drawings of FIGS. 1, 10, 11, 12, & 13. In that embodiment, the bottom air intake port 109A and the top air intake port 109C enter diagonally into the chamber 108 with the forward edge of the bottom air intake port 109A and the top air intake port 109C approximately even with the orifice 105. The side air intake ports 109B, 109D shown in FIG. 11A allow air to enter through the sides in front of the orifice 105. The ratio of the combined area of the air intake ports 109A-D to the area of the orifice may typically be about 5:1 to allow for a free flow of air to enter the chamber from outside the nozzle 100. Depending upon the tire size the device is intended for, the density of the gas being used, the pressure, and other design considerations this ratio may be larger or smaller in some embodiments. And while the height of the chamber 108 decreases from the end closest to the orifice 105 to the outlet 114 to more effectively blow are into the narrow slot between the bead 91 of the tire 90 and the lip 81 of the rim 80, the chamber 108 also widens so as not to decrease the cross-sectional area too much. In some embodiments of the nozzle 100, the outlet 114 is only about 5% smaller than the cross-sectional area of the chamber 108 near where the stream of gas from the orifice 105 enters the chamber 108.

Figure 16A:
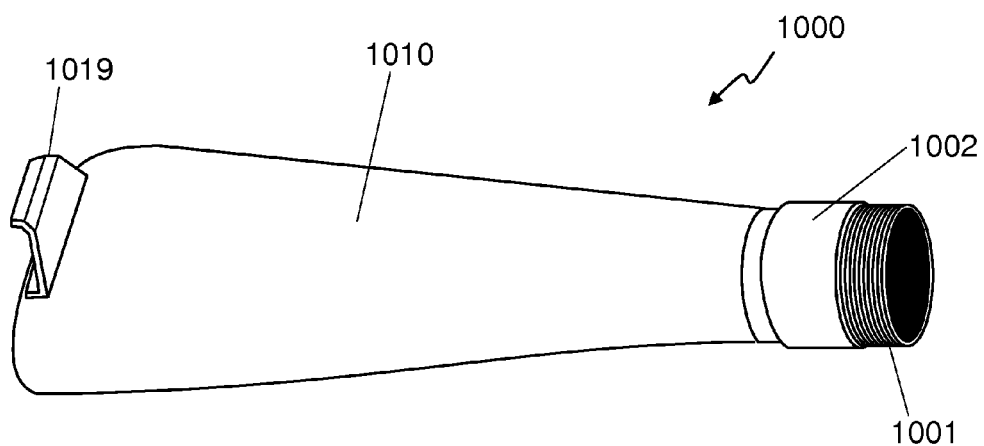
FIG. 16A shows an isometric view and FIG. 16B shows a front view of an embodiment of a conventional nozzle for use in a tubeless tire seating device.
Figure 16B:
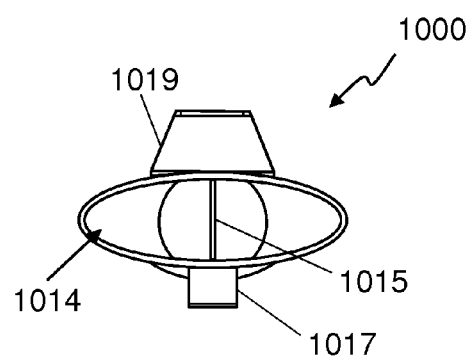

FIG. 16A shows an isometric view from above and behind and FIG. 16B shows a front view of an embodiment of a more conventional nozzle 1000 that may be used in some embodiments of a tubeless tire seating device. Conventional nozzle 1000 may have a threaded fitting 1001 to mate to a source of air such as the tube leading from a tank or pressure vessel. A coupling 1002 may mate the threaded fitting 1001 to a spout 1010 that may flatten and widen as it extends away coupler 1002. The nozzle outlet 1014 of the spout 1010 may be rectangular or oval in shape or in some embodiments the nozzle outlet may be round or round with one flattened side or any other shape suitable for blowing air between a tire and rim. Brace 1015 may provide strength to the nozzle outlet 1014 to help keep it from collapsing due to pressure from the tire and/or rim. A rim bracket 1019 may be attached to the top of the spout 1010 to help a user properly position the nozzle 1000 against the lip of the rim. Tire bumper 1017 may help push the tire away from the rim as the nozzle 1000 is positioned to provide more space for the air to enter the tire.

In various embodiments of a tire seating device the pressure vessel or tank may be rated for any pressure level but in many embodiments the pressure rating may be less than 150 pounds per square inch (psi) for safety reasons. Any size pressure vessel may be used, depending on the tire sizes of the application and the pressure of the gas used but most embodiments may use a tank of less than 10 gallons and one embodiment may use a 5 gallon tank. The various embodiments of a tire seating device with the nozzle using the Venturi effect as well as quickly opening gas valve as disclosed herein may increase the efficiency of the tire seating device and may allow the tank to be smaller and/or at a lower pressure than previous tire seating systems have used. In most such embodiments, the tank may be smaller than the 5 gallon tank that is most commonly used in previous tire seating devices, and be rated for about 130 psi to allow for a typical operating pressure of about 100 psi or less. Many embodiments may use tanks with less than a 2 gallon (~7.5 liter) capacity. Some embodiments may use tanks with a capacity of 6 liters, between 2.0 and 2.5 liters, or about 1 liter although other embodiments may use tanks of nearly any size, depending on the application.

Typically, compressed air may be used as the pressurized gas in the tank but in some embodiments, other pressurized gases, especially inert gases, may be used to fill the tank, including, but not limited to carbon dioxide ($CO_2$), Nitrogen ($N_2$), Argon (Ar) or other gases. In most embodiments, the tank may include an input valve used to fill the tank from a source of pressurized gas and a pressure gauge to measure the internal pressure of the tank. Some embodiments may also include various types of handles or mounting brackets on the tank. In some embodiments, the tank may be removable and be filled through the same opening that air is discharged. An example of this is a tire seating device that uses a high pressure $CO_2$ tank with a capacity of 1 liter or less at 800 psi or more such as might be generally used for paint-ball markers with a gas valve external to the tank.

Unless otherwise indicated, all numbers expressing quantities of elements, optical characteristic properties, and so forth used in the specification and claims are to be understood as being modified in all instances by the term "about." Accordingly, unless indicated to the contrary, the numerical parameters set forth in the preceding specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements. The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to an element described as "a port" may refer to a single port, two ports or any other number of ports. As used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between. The phrase "pneumatically coupled" means that gas is allowed to pass between the devices that are pneumatically coupled.

The term "pistol grip" as used herein means a grip or handle that extends radially from a body (e.g., from a body like the cylindrical pressure vessel) and is configured to fit in the palm of a user's hand. Different embodiments of pistol grips may vary in shape from a simple cylindrical shape to a shape similar to that of the pistol grip on a pistol gun. The pistol grip on a pistol gun is referred to herein as a stylized pistol grip.

Any element in a claim that does not explicitly state "means for" performing a specified function, or "step for" performing a specified function, is not to be interpreted as a "means" or "step" clause as specified in 35 U.S.C. §112, ¶ 6. In particular the use of "step of" in the claims is not intended to invoke the provision of 35 U.S.C. §112, ¶ 6.

The description of the various embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the intended scope of the present invention.

What is claimed is:
1. A tool for seating a tubeless die on a rim using pressurized gas, the tool comprising:

a cylindrical pressure vessel with an input port, said input port suitable for tilting the cylindrical pressure vessel with, said pressurized gas;

a nozzle pneumatically coupled to an outlet on a distal end of the cylindrical pressure vessel said nozzle configured to blow the pressurized gas between a rim and a tire bead;

a gas valve configured to control a flow of the pressurized gas from the outlet on the distal end of the cylindrical pressure vessel;

a pistol grip extending radially from the cylindrical pressure vessel;

a release control located at a position within 15 centimeters (cm) of the pistol grip;

a cylinder with one closed end fixedly positioned inside the cylindrical pressure vessel;

a piston shaped to fit in the cylinder, the piston positioned in the cylinder and having a cross-sectional area greater than an outlet area of the outlet on the distal end of the cylindrical pressure vessel, the piston able to slide in a reciprocating motion In the cylinder, the piston defining a substantially centralized cavity, wherein a control reservoir is created in the cylinder between the closed end of the cylinder and the cavity of the piston, a volume of the control reservoir dependent on a position of the piston in the cylinder;

a compressed spring positioned within the control reservoir between the closed end of the cylinder and a closed end of the cavity, the compressed spring configured to provide force on the piston to help seat the piston against the outlet on the distal end of the cylindrical pressure vessel;

means for filling the control reservoir with control gas to a control pressure; and a release valve having an input and an outlet, the input of the release valve pneumatically coupled to the control reservoir, said release valve positioned to be opened by actuation of the release control;

wherein if the control pressure of the control reservoir is greater than a release pressure the piston is seated against the outlet on the distal end of the cylindrical pressure vessel blocking the pressurized gas from leaving cylindrical pressure vessel; and wherein the gas valve is configured to open in response to actuation of the release control, allowing the control gas in the control reservoir to escape through the outlet of the release valve and the control pressure of the control gas remaining in the control reservoir to drop below the release pressure, resulting in the piston quickly sliding into the cylinder allowing the pressurized gas to flow through the outlet on the distal end of the cylindrical pressure vessel and out the nozzle.

2. The tool of claim 1, wherein the cylindrical pressure vessel has an internal volume of less than 6.1 liters; and
wherein said gas valve Is located inside the cylindrical pressure vessel.

3. The tool of claim 1, wherein the pistol grip Is a stylized pistol grip, and the release control is a trigger located at a trigger position of the stylized pistol grip and configured to be manipulated by a user's index linger, the tool further comprising a trigger guard, wherein the trigger is configured between the stylized pistol grip and the trigger guard.

4. The tool of claim 1, further comprising:
a tube pneumatically coupling the outlet on the distal end of the cylindrical pressure vessel to the nozzle, said tube having a length of at least 30 cm; and
a handle extending radially from the tube.

5. The tool of claim 1, said gas valve comprising:
wherein said release pressure is dependent on a primary pressure of the pressurized gas in the cylindrical pressure vessel and a difference in area between the outlet area and the cross-sectional area of the piston; and
wherein the cylinder is configured to slide away from the outlet on the distal end of the cylindrical pressure vessel, allowing the pressurized gas in the cylindrical pressure vessel to flow through the outlet on the distal end of the cylindrical pressure vessel and out the nozzle.

6. The tool of claim 5, wherein the piston includes a piston ring, the piston ring positioned on the outside of the piston in close engagement with the inside wall of the cylinder; and
wherein said means for filling the control reservoir comprise at least one gap in a piston ring to allow the pressurized gas to flow from cylindrical pressure vessel, through said at least one gap, into the control reservoir.

7. The tool of claim 5, wherein said means for filling the control reservoir comprise:
a hole in the cylinder to allow the pressurized gas to flow from cylindrical pressure vessel, through said hole, into the control reservoir.

8. The tool of claim 5, wherein the release valve is a poppet valve.

9. The tool of claim 5, wherein the piston is comprised of a polyacetal polymer.

10. The tool of claim 5, wherein said means for filling the control reservoir comprise:
a space between the inside wall of the cylinder and the piston.

11. The tool of claim 1, wherein the actuation of the release control opens the control reservoir to atmosphere outside the gas valve, allowing the control gas to escape from the control reservoir to the atmosphere.

12. The tool of claim 1, further comprising:
a cushion provided within the control reservoir between the closed end of the cylinder and the piston, the cushion to aid in preventing said piston from hitting the closed end of the cylinder upon the piston quickly sliding into the cylinder as the gas valve opens.

13. The tool of claim 12, wherein said cushion is an O-ring.

14. A tool for seating a tubeless tire on a rim using pressurized gas, the tool comprising:
a cylindrical pressure vessel with an input port, said input port, suitable for filling the cylindrical pressure vessel with said pressurized gas;
a nozzle pneumatically coupled to an outlet on a distal end of the cylindrical pressure vessel, said nozzle configured to blow the pressurized gas between a rim and a tire head;
a gas valve configured to control a flow of the pressurized gas from the outlet on the distal end of the cylindrical pressure vessel;
a pistol grip extending radially from the cylindrical pressure vessel; and
a release control located at a position within 15 centimeters (cm) of the pistol grip; wherein the nozzle comprises
a jet configured to accept the pressurized gas flowing through the outlet on the distal end of the cylindrical pressure vessel and emit a first stream of gas through an orifice;
a nozzle outlet suitable for directing a second stream of gas into a gap between the rim and die tire bead;

a chamber extending into the nozzle from the nozzle outlet and situated to allow the first stream of gas to enter the chamber, the chamber having a cross sectional area at a point near where the first stream of gas enters the chamber that is larger than the orifice, said cross sectional area measured in a direction substantially perpendicularly to a direction of flow of the first stream of gas as it is emitted from the orifice; and at least one air intake port situated to allow air from outside the nozzle to enter the chamber and he emitted from the nozzle outlet if the stream of gas is flowing from the orifice, through the chamber and out of the nozzle outlet;

wherein the second stream of gas comprises the first steam of gas and said air from outside the nozzle; and wherein the gas valve is configured to open in response to actuation of the release control, allowing the pressurized gas to flow through the outlet on the distal end of the cylindrical pressure vessel and out the nozzle.

15. The tool of claim 14, further comprising:

a rim bracket attached to the nozzle near the nozzle outlet;

wherein the rim bracket is configured to catch on a lip of a tire rim if the nozzle is positioned between the tire rim and a tire mounted on the tire rim to blow air into tire.

16. The tool of claim 14, wherein a combined area of the at least one air intake port is at least as large as the orifice.

17. The tool of claim 1, wherein air that did not come from the cylindrical pressure vessel, enters the tire due to a Venturi effect in response to the gas flowing through the nozzle.

\* \* \* \* \*